United States Patent
Yin et al.

(10) Patent No.: US 12,224,929 B2
(45) Date of Patent: Feb. 11, 2025

(54) SYSTEMS AND METHODS FOR MULTI-PHASE RECODING FOR BATCHED NETWORK CODING

(71) Applicant: n-hop technologies Limited, Pak Shek Kok (HK)

(72) Inventors: Ho Fai Hoover Yin, Tin Shui Wai (HK); Mehrdad Tahernia, Pak Shek Kok (HK)

(73) Assignee: n-hop technologies Limited, Pak Shek Kok (HK)

( * ) Notice: Subject to any disclaimer, the term of this patent is extended or adjusted under 35 U.S.C. 154(b) by 303 days.

(21) Appl. No.: 17/941,921

(22) Filed: Sep. 9, 2022

(65) Prior Publication Data
US 2024/0089191 A1    Mar. 14, 2024

(51) Int. Cl.
*H04L 45/125*    (2022.01)
*H04L 45/00*    (2022.01)
*H04W 40/24*    (2009.01)

(52) U.S. Cl.
CPC ............ *H04L 45/125* (2013.01); *H04L 45/26* (2013.01); *H04W 40/246* (2013.01)

(58) Field of Classification Search
CPC ..... H04L 45/125; H04L 45/26; H04L 1/1671; H04L 1/1819; H04L 1/0075; H04L 1/0057; H04L 2001/0097; H04W 40/246; H04B 7/15507; H04N 19/20; H04N 19/13
See application file for complete search history.

(56) References Cited

U.S. PATENT DOCUMENTS

| | | | |
|---|---|---|---|
| 10,425,192 B2* | 9/2019 | Yin | H04L 1/0071 |
| 2017/0230144 A1* | 8/2017 | Wu | H03M 13/3761 |
| 2022/0173834 A1* | 6/2022 | Vidal | H04L 1/0075 |

OTHER PUBLICATIONS

Phung, C. V. et al. "Enhancing REST HTTP with Random Linear Network Coding in Dynamic Edge Computing Environments," IEEE, 2019 42nd International Convention on Information and Communication Technology, Electronics and Microelectronics (MIPRO), pp. 435-440, May 2019, 7 pages.
Phung, C. V. et al. "Enhancing Block-Wise Transfer with Network Coding in CoAP," Springer, Euro-Par 2019: Parallel Processing Workshops, pp. 737-741, May 2020, 4 pages.
(Continued)

*Primary Examiner* — Hashim S Bhatti
(74) *Attorney, Agent, or Firm* — Norton Rose Fulbright US LLP

(57) ABSTRACT

Systems, methods, apparatuses, and techniques for multi-phase recoding with respect to batched network coding (BNC) are described. In operation of a multi-phase recoding technique a first node in a multi-hop wireless network data communication path between a source node and a destination node provides recoding and transmission of packets of a BNC batch to a second node in the communication path via multiple phases. Multi-phase recoding makes use of the reception status of the recoded packets that have been received by the second node in earlier phases of multi-phase recoding operation with respect to transmission of a particular batch. Multi-phase recoding feedback from the second node to the first node may be provided so that the first node can determine how many recoded packets are to be sent in the next phase of multi-phase recoding operation.

28 Claims, 9 Drawing Sheets

(56) References Cited

OTHER PUBLICATIONS

Yin, Hoover H. F. et al. "A Unified Adaptive Recoding Framework for Batched Network Coding," IEEE Journal on Selected Areas in Information Theory, vol. 2, Issue 4, pp. 1150-1164, Dec. 2021, 49 pages.
European Patent Office, Communication, Extended European Search Report issued for European Patent Application No. 23193083.5, dated Jan. 30, 2024, 9 pages.
Zhang, H. et al. "FUN Coding: Design and Analysis," IEEE/ACM Transactions on Networking, vol. 24, No. 6, pp. 3340-3353, Dec. 2016, 14 pages.
Yang, S. et al. "BATS: Network Coding in Action," IEEE, 2014 52nd Annual Allerton Conference on Communication, Control, and Computing (Allerton), Sep. 30-Oct. 3, 2014, pp. 1204-1211, 8 pages.
Yin, Hoover H. F. et al. "A Protocol Design Paradigm for Batched Sparse Codes," Entropy, vol. 22, Issue 7, Jul. 2020, 57 pages.

\* cited by examiner

SYSTEMS AND METHODS FOR MULTI-PHASE RECODING FOR BATCHED NETWORK CODING

TECHNICAL FIELD

The present disclosure generally relates to batched network coding (BNC) communications and more specifically to systems and methods for multi-phase recoding with respect to BNC.

BACKGROUND

Interest in multi-hop wireless networks has become a subject of interest recently due to their potential to support certain use cases for wireless connectivity, such as smart city and Internet-of-Things (IoT) applications. To support such use cases many devices or nodes, in wireless communication with one or more others of the nodes, may be utilized to cover a desired area, such as a city, a building (e.g., a factory or manufacturing facility, an office building, a warehouse, etc.), or other area. In operation of multi-hop networks, a file (e.g., any particular unit of data for communication, not restricted to a file in the sense of file system) is processed by a source node to generate one or more packets and the packet(s) are transmitted to a destination node via one or more intermediate nodes of the multi-hop network.

Smart city and other use cases for multi-hop wireless networks may require a large number of nodes to provide effective coverage of the desired environment. Accordingly, the nodes used in multi-hop wireless networks tend to be lower cost devices that have fewer computational resources (e.g., processing resources, memory resources, and the like) as compared to nodes used in other types of networks and applications (e.g., cellular communications).

A nature of wireless links is that they can be easily interfered. For example, packet loss is a common phenomenon on wireless links because of interference by other wireless signals and environment factors (e.g., buildings, vehicles, frequency modulated (FM) radio signals, or other factors). A packet received by a node with a mismatched checksum is regarded as a corrupted packet and is dropped by the node.

Traditional network transmission approaches utilizing forwarding and end-to-end retransmission, such as those used in Wireless Fidelity (Wi-Fi) or other types of networks, do not perform well in multi-hop wireless networks. This is because a packet must be transmitted successfully on all the links of a multi-hop wireless network between a source node and a destination node in order for the packet to reach its destination. However, the probability of a packet reaching its destination diminishes exponentially as the number of hops traversed to reach a destination node increases.

Due to the relatively lower computational resources typically found in nodes used for many multi-hop wireless network use cases, factors that negatively impact the performance of wireless communications may have a great impact. For example, network throughput and/or other network communication metrics can be more significantly impacted in a multi-hop wireless network as a result of packet loss than in a more traditional network in which nodes possess robust computational resources.

Random linear network coding (RLNC) is approach developed to address packet loss in networks. RLNC is a conceptually simple realization of network coding that can be applied without knowing the network topology ahead of time. For many scenarios, RLNC can be used for network coding and achieve the capacity of networks subject to packet loss.

The simplest RLNC scheme can be described as:

(1) A source node (e.g., the node originating the data transmission) divides the file into multiple parts of the same length, where each part is called an input packet, and the input packets are padded with arbitrary symbols (e.g., zeros) when necessary to achieve the same length. This type of padding overhead is known as the zero-padding overhead.

(2) The source node generates random linear combinations of the input packets (e.g., generates coded packets). Each packet generated by the source using RLNC has a coefficient vector attached, which records the coefficients of the linear combinations during the transmission (i.e., the way to form this packet).

(3) The source node transmits the random linear combinations of the input packets (e.g., transmits the coded packets) with their attached coefficient vectors. In particular, the coded packets are transmitted to a next node (e.g., intermediate node) in the multi-hop wireless network.

(4) At each intermediate node (i.e., nodes of the multi-hop wireless network in a communication path between the source node and destination node, other than the source node or destination nodes, that receive and retransmit the packets), the correctly received coded packets are buffered.

(5) The intermediate node generates random linear combinations of the buffered packets for the same file (e.g., the same piece of data) and corresponding coefficient vectors. This procedure is called recoding.

(6) The intermediate node transmits the random linear combinations of the buffered packets (e.g., transmits the recoded packets) with their attached coefficient vectors. In particular, the recoded packets are transmitted to a next node (e.g., intermediate node or destination node) in the multi-hop wireless network.

(7) The destination node recovers the input packets by solving the equations given by the coefficient vectors.

Once the destination node has received a large enough number of packets with linearly independent coefficient vectors, all the input packets can be recovered by the destination node. Accordingly, the source node can keep generating packets so that the destination node can eventually receive enough packets with linearly independent coefficient vectors to recover all the input packets. In this manner, the network code itself plays the role of an end-to-end erasure correction code so that packet loss can be mitigated.

The computational cost of RLNC encoding and decoding, the storage and computational costs at the intermediate nodes, and the large overhead of the coefficient vector for each packet all present issues which hamper the direct adoption of RLNC in many multi-hop wireless network scenarios. One technique used to mitigate the above issues is batched network coding (BNC)

BNC applies network coding to a small subset of the coded packets generated from the input packets. In BNC implementations the encoder of the source node generates batches, each containing relatively few coded packets generated from a subset of input packets, and transmits the batches to a destination node via intermediate nodes of the multi-hop wireless network. Accordingly, not all the input packets are involved in the generation of the coded packets, which reduces encoding complexity. At each intermediate node, in a process known as recoding, network coding is applied to the packets belonging to the same batch. Accordingly, the attached coefficient vector records the linear combination associated with that batch only. The length of the coefficient vector in BNC implementations is proportional to the batch size instead of the total number of input packets, which greatly reduces the overhead of the coefficient vector for each coded/recoded packet. Also, only relatively few packets are involved during the generation of a recoded packet. An additional advantage of BNC is that a batch (e.g., a batch of buffered packets) may be discarded once no more recoded packets are to be generated from this batch. Issues with respect to storage and computational costs at the intermediate nodes of a multi-hop wireless network are thus mitigated by BNC.

In BNC implementations the decoder of the destination node is applied to recover the input packets of each batch. Due to the sparsity in the sense of input packets of a batch, there exist various efficient decoding approaches such as belief propagation decoding that can mitigate issues with respect to decoding complexity.

As can be appreciated from the foregoing, the use of BNC may mitigate a number of issues with respect to storage and computational costs, making BNC well suited for use in various multi-hop wireless network scenarios. Nevertheless, typical BNC implementations may, however, experience less than optimal performance or otherwise experience diminished performance (e.g., reduced throughput, increased latency, and/or non-optimal operation with respect to other network communication metrics). For example, the recoding strategy of BNC has an impact on the system throughput. According to one example, the allocation of the number of recoded packets used has an impact on system throughput depending upon aspects (e.g., batch size, length of input packet, etc.) of the batches being recoded. Adaptive recoding is a recoding technique that seeks to optimize the allocation of the number of recoded packets for different batches (see e.g., H. H. F. Yin, B. Tang, K. H. Ng, S. Yang, X. Wang, and Q. Zhou, "A Unified Adaptive Recoding Framework for Batched Network Coding," IEEE Journal on Selected Areas in Information Theory (JSAIT), vol. 2, no. 4, Dec. 2021, pp. 1150-1164, the disclosure of which is incorporated herein by reference). Although adaptive recoding generally outperforms baseline BNC recoding (e.g., assigning the same number of recoded packets for each batch), the technique adds complexity to the recoding and decoding processes. According to another example, the system throughput is higher if the recoding of a batch starts after the node has received all the packets of the current batch that are neither dropped nor lost. This approach, however, induces a latency. Systematic recoding (i.e., a recoding technique that regards linearly independent packets of the received packets as recoded packets so that these packets can be forwarded before generating new recoded packets by linear combinations) may be utilized in some BNC implementations to result in latency reduction (see e.g., U.S. Pat. No. 10,425,192 and H. H. F. Yin, R. W. Yeung, and S. Yang, "*A Protocol Design Paradigm for Batched Sparse Codes*," Entropy, vol. 22, no. 7, Jul. 2020, Art. no. 790, the disclosure of which are incorporated herein by reference).

As can be appreciated from the foregoing, there are various factors that may impact the performance of multi-hop wireless networks and those factors may impose design constraints that limit the ability to deploy multi-hop wireless networks in some instances. For example, limited computational resource nodes may be well-suited for many multi-hop wireless network-based use cases due to their smaller form factors and low cost of deployment, but the limited computational resources may result in relatively poor performance in many scenarios. Various techniques available to mitigate some of the issues with respect to storage and computational costs nonetheless continue to result in less than optimal or diminished performance.

SUMMARY OF THE INVENTION

Embodiments of the present disclosure provide systems, methods, apparatuses, and techniques for multi-phase recoding with respect to batched network coding (BNC). In operation of a multi-phase recoding technique according to some examples, a current node (e.g., first intermediate node) in a multi-hop wireless network data communication path between a source node and a destination node provides recoding and transmission of packets of a BNC batch (i.e., batched input packets) to a next node (e.g., second intermediate node) in the communication path via multiple phases. According to aspects of the disclosure, multi-phase recoding makes use of the reception status of the recoded packets that have been received by the next node in earlier phases of multi-phase recoding operation with respect to transmission of a particular batch. For example, feedback (referred to herein as "multi-phase recoding feedback") from the next node to the current node carrying information about the received packets of the batch at the next node may be provided so that the current node can determine how many recoded packets are to be sent in the next phase of multi-phase recoding operation. Embodiments of multi-phase recoding implementations in accordance with concepts of the present disclosure facilitate significant increases or improvements in system throughput, as compared with traditional recoding (i.e., single-phase) techniques.

In operation of a multi-phase recoding technique of embodiments of the invention, a determination is made with respect to a number of recoded packets of a BNC batch to be transmitted in phases of the multiple phases based on information about the received packets of the batch at the next node. For example, rank information regarding the dimension of the vector space spanned by the coefficient vectors of packets of the batch may be utilized according to some examples in determining a number of recoded packets for one or more phases of multi-phase recoding operation.

Multi-phase recoding techniques of embodiments of the invention may implement various recoding methodologies in the multiple phase framework for recoding and transmission of packets, such as to facilitate further improvement with respect to system throughput, latency, etc. For example, multi-phase adaptive recoding implementations may utilize probability metrics based on rank information to determine the number of recoded packets with respect to one or more phase of multi-phase recoding operation for a BNC batch. As another example, systematic multi-phase recoding implementations may treat received packets of a batch as recoded packets of the batch for transmission to a next node. Systematic multi-phase adaptive recoding implementations may provide simplified operation with respect to the aforementioned multi-phase adaptive recoding operation.

Embodiments in accordance with the present disclosure provide a batch management system configured for multi-phase recoding operation, such as to facilitate better utilization of network nodes within a multi-hop wireless network. A batch management system may, for example, be implemented by multi-phase recoding logic of various nodes of a multi-hop wireless network in which multi-phase recoding is utilized to organize the batches and files, keep track of and update the timeout of the batches and the files, discard and/or recode the outdated batches and files, etc. Batch management systems of some embodiments may implement various structures, such as timeout heaps, batch structures, and file structures, for providing management with respect to handling of batched input packets by a node.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF DRAWINGS

For a more complete understanding of the present disclosure, reference is now made to the following descriptions taken in conjunction with the accompanying drawings, in which.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Figure 1:
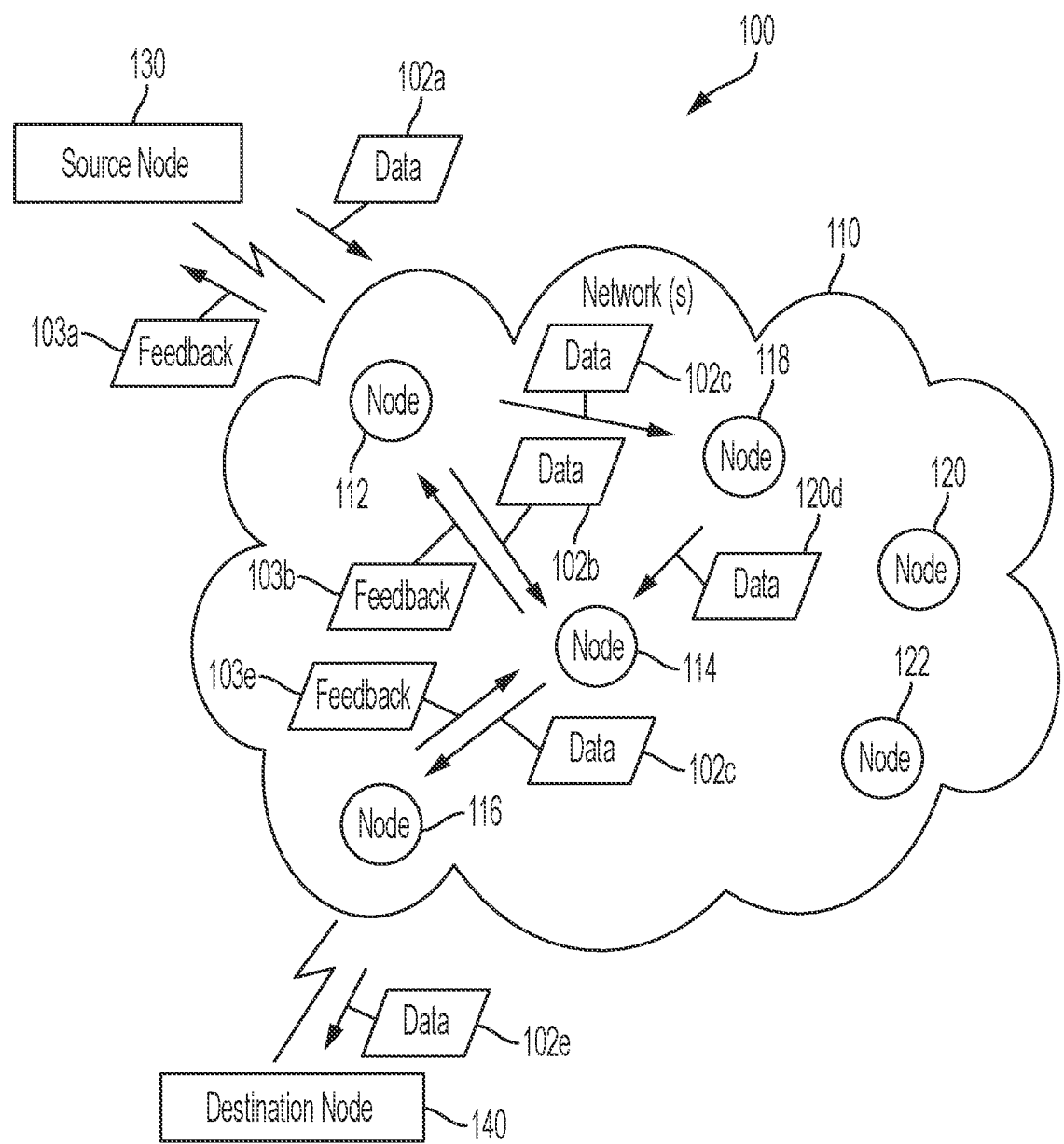
FIG. 1 shows a block diagram of a system in accordance with aspects of the present disclosure.

FIG. 1 shows a block diagram of a system in accordance with aspects of the present disclosure. System 100 provides functionality for improving network performance (e.g., system throughput) through implementing multi-phase recoding. In particular, as described in more detail below, some or all of the nodes of system 100 may implement techniques for multi-phase recoding with respect to batched network coding (BNC) in accordance with concepts herein.

As shown in FIG. 1, data communication is facilitated through nodes of a multi-hop network. For example, source node 130 of system 100 may comprise a data source (e.g., file, web, media, and/or other server system, streaming media source, computer system, smart phone, tablet device, and/or other user device, sensor, actuator, etc.) providing transmission of one or more files (e.g., a unit of data for communication, such as may be a file in the sense of file system, captured network traffic in a short timeframe, parts of a real-time stream, sensor data, etc.) to a data destination (e.g., server system, control system, user device, sensor, actuator, etc.). Accordingly, network 110 includes a plurality of nodes 112-122 comprising a multi-hop network in which files may be transmitted via multiple hops between the nodes. Data 102 may, for example, be transmitted from source node 130 to destination node 140 via network 110. In the illustrated example, data 102 (e.g., comprising a file or some portion thereof) is communicated between source node 130 and destination node 140 via nodes (e.g., nodes 112-118) of the multi-hop wireless network in a communication path between the source node and destination node.

As can be appreciated from the foregoing, nodes (e.g., any or all of nodes 112-122) of network 110 provide intermediate nodes of a multi-hop network facilitating communication between source and destination nodes (e.g., source node 130 and destination node 140) via multiple hops. It is noted that while FIG. 1 shows network 110 as including an exemplary configuration of network nodes (e.g., nodes 112-122, 130 and 140), embodiments of the present disclosure may be readily utilized in network deployments having more or less than the number of network nodes shown, according to the particular use case involved.

Network 110 of embodiments may comprise one or more networks, such as may include cellular networks, local area networks (LANs), metropolitan area networks (MANs), wide area networks (WANs), satellite communication networks, intranets, the Internet, etc. Accordingly, it is to be understood that while FIG. 1 shows the network 110 as single logical grouping of nodes, the concepts described herein may be readily applied to more complex network environments. A multi-hop wireless network according to the concepts disclosed herein may be deployed in an environment where other types of wired or wireless communication networks may not be suitable (e.g., due to noise, cost, etc.) and one or more devices of the multi-hop network may be communicatively coupled to other types of networks or act as gateways to other types of networks. In such deployments, the gateway between a multi-hop wireless network operating in accordance with the present disclosure and other types of networks may reconstruct the files (e.g., once a sufficient number of input packets (or batches of input packets) have been received) and retransmit the files over other types of networks using different protocols and techniques or vice versa.

According to concepts of the present disclosure, the network topology is assumed to be arbitrary, and a node may receive packets of the same batch from more than one node in the network (e.g., as shown by node 114 receiving data 102$b$ for a batch from node 112 and data 102$d$ for the batch from node 118). It should be understood that, although source node 130 and destination node 140 are shown external to the cloud of network 110, either or both of source node 130 and destination node 140 may comprise nodes of network 110 according to embodiments of the invention.

It is noted that while data 102 is shown in FIG. 1 as a single logical block, such depiction has been provided for purposes of illustration, rather than by way of limitation. As described in more detail below, data 102 may be transmitted as a plurality of coded/recoded input packets, which may be batched using a BNC encoder/recorder (e.g., a batch of input packets of a BNC implementation transmitted as coded and recoded packets of data 102a-102e) in accordance with the concepts described herein. That is, data 102 may each comprise a plurality of distinct coded/recoded packets for a batch of input packets.

Figure 2:
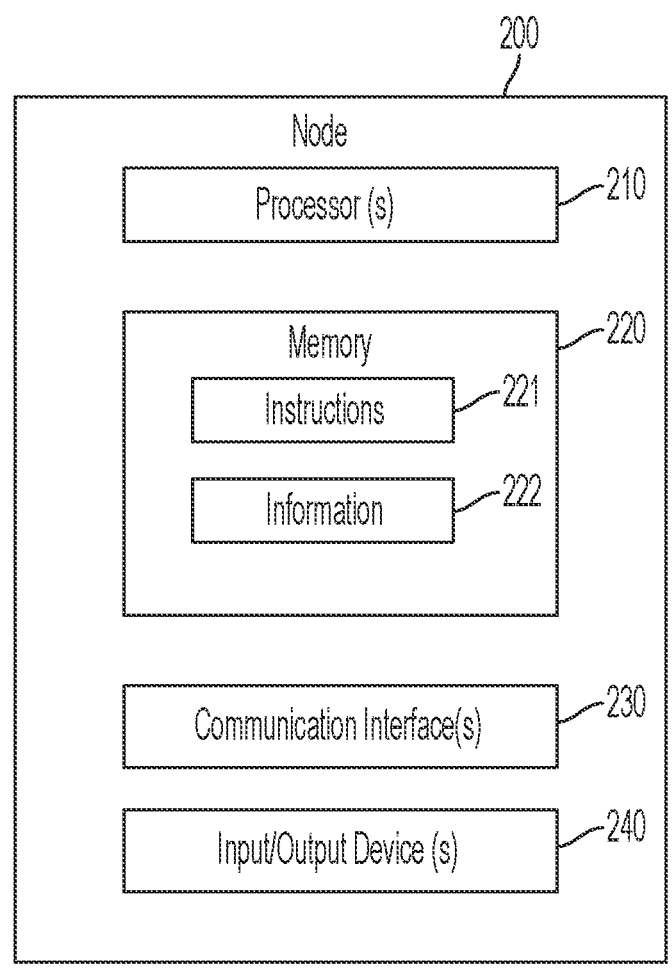
FIG. 2 shows a block diagram of a network node in accordance with aspects of the present disclosure.

The various nodes of network 110 comprise various forms of processor-based devices (e.g., server systems, computer systems, base stations, access points, hubs, switches, gateways, sensors, actuators, Internet appliances, Internet of Things (IoT) devices, etc.) configured and operable to perform functions as described herein. Accordingly, it should be understood that any or all of nodes 112-122, 130, and 140 may include processors, memory, communication interfaces, sensors, or other types of components and devices suitable for performing the operations described herein. FIG. 2 shows node 200 of an example node configuration, such as may correspond to any of nodes 120, source node 130, and destination node 140, providing a processor-based platform as may be utilized according to embodiments of the invention.

As shown in FIG. 2, node 200 includes one or more processor(s) 210, memory 220, one or more communication interfaces 230, and one or more input/output (I/O) device(s) 240. Processor(s) 210 may include one or more microcontrollers, application specific integrated circuits (ASICs), field programmable gate arrays (FPGAs), central processing units (CPUs) and/or graphics processing units (GPUs) having one or more processing cores, or other circuitry and logic configured to facilitate the operations of the node in accordance with aspects of the present disclosure. Memory 220 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, and/or other memory devices configured to store data in a persistent (e.g., non-transient) state. Software, logic, code, and/or the like (collectively referred to herein as "instructions"), configured to facilitate operations and functionality of the node may be stored in memory 220 as instructions 221 that, when executed by the one or more of processor(s) 210, cause the one or more processors to perform operations described herein with respect to node 200. Additionally or alternatively, memory 220 may be configured to store data, parameters, values, file structures, buffer contents, queue contents, databases, and/or the like (collectively referred to herein as "information") as information 222.

Communication interfaces 230 may be configured to communicatively couple node 200 to various devices, such as one or more other nodes of network 110, via wired and/or wireless communication links. The communication links may, for example, be established according to one or more communication protocols or standards (e.g., Ethernet, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, Bluetooth Low Energy (BLE), and/or the like). I/O device(s) 240 may include one or more display devices, keyboards, styluses, touchscreens, mice, trackpads, microphones, cameras, speakers, haptic feedback devices, and/or other types of devices that enable a user to receive and/or view information, to provide information to the node, to output information from the node, etc. In some implementations, node 200 is coupled to the display device, such as a monitor, a display (e.g., a liquid crystal display (LCD) or the like), a touch screen, a projector, a virtual reality (VR) display, an augmented reality (AR) display, an extended reality (XR) display, or the like. In some other implementations, the display device is included in or integrated in node 200.

Although the illustration of FIG. 2 shows an example of a processor-based platform as may be implemented by node configurations implementing multi-phase recoding in accordance with concepts of the present invention, it should be appreciated that the particular configuration of various of the nodes may nevertheless differ from one another. For example, intermediate nodes of a multi-hop wireless network in some scenarios may have fewer computational resources (e.g., processing resources, memory resources, and the like) as compared to other nodes of the system (e.g., source node 130 and/or destination node 140).

To facilitate transmission of data 102 to destination node 140, the file may be broken down into a set of input packets by source node 130 for communication via network 110. In implementation of BNC, source node 130 encodes batches of the input packets included in the set of input packets, generating random linear combinations of the batches of input packets. Coded packets of a batch of input packets transmitted by source node 130 may, for example, is represented FIG. 1 as data 102a. The batch of input packets are recoded according to a BNC implementation as they travers network. For example, recoded packets of the example batch of packets transmitted by source node 130 are represented in FIG. 1 as data 102b-102e. For simplicity, the coded packets and recoded packets in a batch are also referred to herein as "packets," such as where a distinction between coding and recoding is superfluous and/or the context is otherwise clear.

Typical implementations of BNC implement a "fire-and-forget" approach to determining the number of recoded packets. For example, a node determines or otherwise is provided a number of recoded packets to transmit with respect to a file or a batch and transmits that number of recoded packets without considering the reception status of the forwarded packets.

Multi-phase recoding operation according to embodiments of the present invention provides for a current node (e.g., one of nodes 112-122) in a multi-hop wireless network data communication path between a source node and a destination node provides recoding and transmission of packets of a BNC batch (i.e., batched input packets) to a next node (e.g., another one of nodes 112-122) in the communication path via multiple phases. According to examples, a multi-phase recoding feedback system is provided to acknowledge some information about the received packets at the next node, wherein this information may be used to better determinations with respect to numbers of recoded packets transmitted by the current node. In other words, multi-phase recoding makes use of the reception status of the recoded packets that have been received by the next node in earlier phases of multi-phase recoding operation with respect to transmission of a particular batch. According to aspects of the disclosure, such more-than-one-shot recoding (i.e., multi-phase recoding) provides appreciable benefits with respect to the system throughput (e.g., dynamically, efficiently, and effectively compensates for packet loss within a communication between the current and next nodes).

Figure 3:
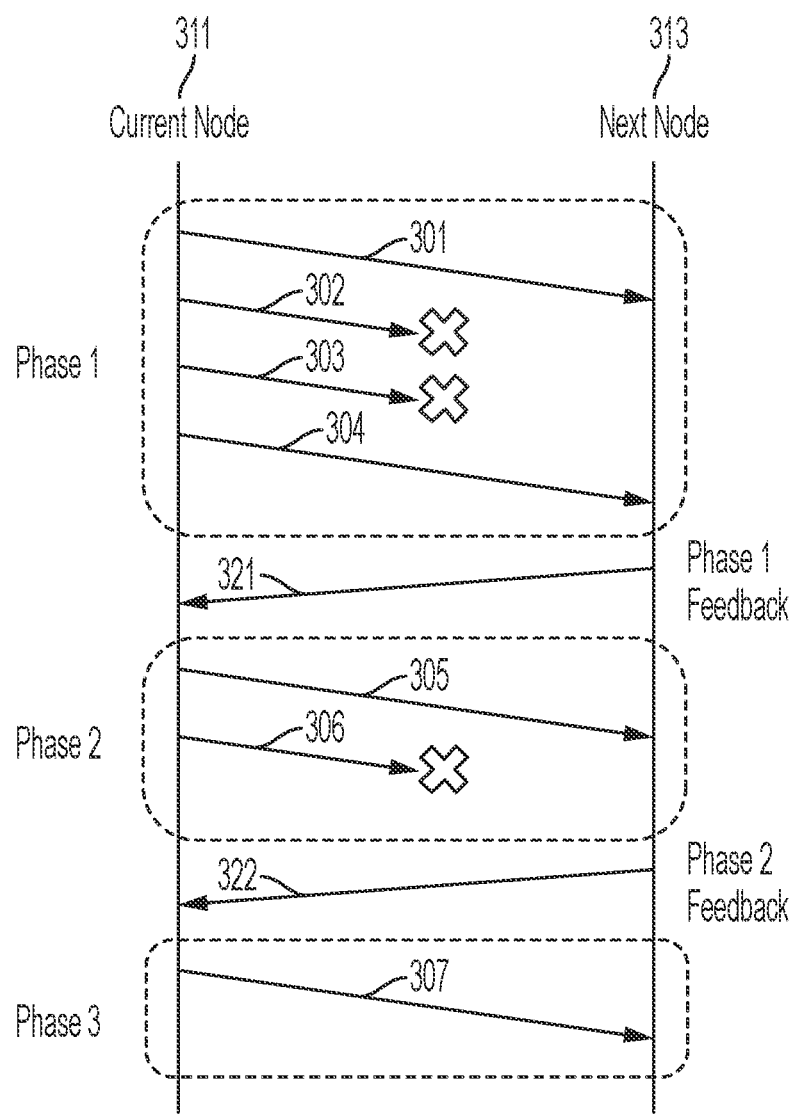
FIG. 3 shows a ladder diagram of multi-phase recoding operation in accordance with aspects of the present disclosure.

FIG. 3 shows a ladder diagram illustrating multiple phase transmission of a batch from a first network node (shown as current node 311) to a second network node (shown as next node 313) of a multi-hop wireless network in accordance with multi-phase recoding operation of aspects of the disclosure. Current node 311 and next node 313 may correspond to any respective node of FIG. 1. For example, current node 311 may correspond to node 112 and next node 313 may correspond to node 114 disposed in the data communication path between source node 130 and destination node 140 of the example of FIG. 1. It should be appreciated that the designations "current node" and "next node" as shown in the example of FIG. 3 provide descriptors relative to a particular hop of a multi-hop wireless network and are not limiting with respect to the particular nodes within a network that may implement multiple phase transmission techniques in accordance with concepts of the present invention. For example, current node 311 may be the previous node and next node 313 may be the current node in a subsequent hop of the multiple hops between the nodes of a network (e.g., network 110), while a node not shown in FIG. 3 may be the next node in the subsequent hop.

The multiple phase transmission of the example of FIG. 3 implements three transmission phases (shown as Phase 1, Phase 2, and Phase 3). Although the example of FIG. 3 shows a three phase implementation of multi-phase recoding operation, it should be understood that more or fewer transmission phases may be implemented according to embodiments of the present invention. The maximum allowed number of transmission phases for multi-phase recoding operation is a selectable or configurable parameter according to some examples (e.g., according to an implementation of the example of FIG. 3, at most 3 transmission phases are allowed).

In the example of FIG. 3, each arrowed line extending from current node 311 toward next node 313 (shown as lines 301-307) represents the transmission of a distinct packet (e.g., a coded/recoded packet in accordance with a multi-phase recoding packet structure described below). The arrowed lines encircled by the dotted lines corresponding to a transmission phase (e.g., lines 301-304 of Phase 1, lines 305 and 306 of Phase 2, and line 307 of Phase 3) represent the packet transmissions by current node 311 to next node 313 during the respective transmission phase. The arrowed lines fully extending from current node 311 to next node 313 (e.g., lines 301, 304, 305, and 307) each represent a packet that is successfully received by next node 313. The arrowed lines extending from current node 311 and terminating prior to reaching next node 313 (e.g., lines 302, 303, and 306, terminating at an "X") each represent a packet that is lost or dropped. A "received packet" of a batch at a node may, for example, be a packet received at a node that is not dropped. A packet may be dropped due to various reasons, such as channel erasure, wrong checksum, etc.

The transmission of a batch at the current node according aspects of the disclosure ends when the number of phases exceeds the maximum allowed number of phases, or when the current node cannot provide any more useful packets to the next node (e.g., no further packets with linearly independent coefficient vectors are available for transmission). For example, transmission of the batch by current node 311 shown in FIG. 3 ends with Phase 3 (e.g., a next phase, "Phase 4", would exceed the maximum allowed number of phases in this example). Alternatively, transmission of the batch by current node 311 may terminate prior to packet transmissions of Phase 3 where current node 311 cannot further provide useful packets to next node 313.

According to multi-phase recoding operation of aspects of the disclosure, multi-phase recoding feedback (e.g., feedback 103, shown as feedback 103a, 103b, and 103e, of FIG. 1) may be utilized to carry information to the current node about the received packets of the batch at the next node. In the example of FIG. 3, each arrowed line extending from next node 313 toward current node 311 (shown as lines 321 and 322) represents transmission of multi-phase recoding feedback (e.g., a multi-phase recoding feedback packet in accordance with a multi-phase recoding feedback packet structure described below). Multi-phase recoding feedback may be provided by the next node according to embodiments of the invention so that the current node can determine (e.g., using techniques as described below) how many recoded packets are to be sent in one or more next phase.

Embodiments of multi-phase recoding implementations may utilize one or more techniques to facilitate reliable feedback from the next node by the current node. For example, the next node may transmit the multi-phase recoding feedback a plurality of times (e.g., 2, 3, 4, 5, etc. times), embed the information of the multi-phase recoding feedback in other packets, and/or use a reliable side channel for transmission of multi-phase recoding feedback.

In operation according to some examples, such as those implementing one or more reliable feedback technique, for any positive integer i, the $(i+1)^{th}$ phase transmission can be started after the current node has received the multi-phase recoding feedback for the $i^{th}$ phase from the next node. Multi-phase recoding operation according to some examples may additionally or alternatively implement techniques for starting a phase transmission in a case in which multi-phase recoding feedback is lost. For example, a next phase may be started after a timeout (e.g., a timeout based upon an estimate on the "usual time" it takes for the multi-phase recoding feedback from the next node to arrive at the current node). The trigger for the first transmission phase may, however, comprise a special case as described further below.

Various techniques may be utilized according to multi-phase recoding implementations to determine when the multi-phase recoding feedback should be generated and transmitted from a next node to a current node. For example, generation and transmission of multi-phase recoding feedback of some embodiments may be triggered by a timeout after the reception of the last received packet of the batch in a particular phase. Additionally or alternatively, generation and transmission of multi-phase recoding feedback may be triggered by estimating the arrival time of the last packet by using the transmission rate. As can be seen in the example of FIG. 3, generation and transmission of multi-phase recoding feedback may be omitted according to some embodiments after a final transmission phase (e.g., Phase 3 in the illustrated example) due to it being the last phase with respect to transmission of the particular batch.

It should be appreciated that there are a number of different packet structures for BNC for supporting different functionalities according to the code designs (see e.g., U.S. Pat. No. 10,425,192 referenced above; see also, H. Zhang, K. Sun, Q. Huang, Y. Wen, and D. Wu, "*FUN coding: Design and analysis,*" IEEE/ACM Transactions on Networking, vol. 24, no. 6, pp. 3340-3353, December 2016, and S. Yang, R. W. Yeung, J. H. F. Cheung, and H. H. F. Yin, "*BATS: Network Coding in Action,*" 2014 52nd Annual Allerton Conference on Communication, Control, and Computing (Allerton), Monticello, IL, USA, 30 Sep.-3 Oct. 2014, pp. 1204-1211, the disclosures of which are incorporated herein by reference). A common feature of the packet structures is that each of the packets has at least the following 3 data fields: batch identification (ID), coefficient vector, and payload. The batch ID is an identifier to distinguish packets of different batches. The coefficient vector is a vector to record the recoding operations. The payload is the body of the coded data carried by the packet.

Embodiments of multi-phase recoding implementations in accordance with concepts herein may introduce or otherwise utilize one or more data fields in a multi-phase recoding packet structure in addition to the aforementioned batch ID, coefficient vector, and payload data fields. For example, data fields included in the data structure of packets of a batch transmitted from a current node to a next node in multi-phase recoding operation may comprise encoder ID and/or file ID. Encoder ID utilized according to some examples may provide an identifier for distinguishing different data end-to-end flows. According to an example implementation, encoder ID may, for example, comprise a hash of the source and the destination Internet protocol (IP) addresses and ports. File ID utilized according to some examples may provide an identifier for distinguishing different files (e.g., independent data) in the same end-to-end flow. The file ID may also serve as a clue for recovering the data in different chunks sequentially according to an example implementation. Encoder ID and/or file ID data fields of embodiments of the disclosure may, for example, be provided for facilitating communications with respect to scenarios in a general network where the data flow is not fixed to a pair of source and destination nodes, and there is more than one "file" (e.g., a plurality of units of data for communication) to be sent. The recoding phase a packet belongs to may be omitted from the data fields of a multi-phase recoding packet structure of some embodiments of the disclosure, because the recoded packets across different phases are generated from the same set of packets by taking linear combinations.

In multi-phase recoding operation according to some embodiments, if the time for the next node to generate a multi-phase recoding feedback message is decided based on the estimated time for the current phase to end, then a packet ID for each packet in the batch and the number of recoded packets to be sent in this phase may also be included in the packet. That is, the data fields introduced or otherwise utilized in a multi-phase recoding packet structure according to some embodiments may additionally include packet ID and number of recoded packets data fields. An identifier of the current node may be extracted from other network protocols, such as the IP address and the port at the current node, according some examples.

To aid in understanding aspects of multi-phase recoding feedback according to concepts of the present disclosure, it is helpful to understand terminologies utilized herein with respect to multi-phase recoding operation. As used herein, the rank of a batch at a node (referred to herein as "rank") is the dimension of the vector space spanned by the coefficient vectors of the received packets of the batch. The rank of a batch at node A with respect to another node B (referred to herein as "informative rank") is the dimension of the vector space spanned by the coefficient vectors of the received packets of the batch at both node A and node B minus the rank of the batch at node B. The informative rank may thus be conceptualized as the amount of "rank" that node A can provide to node B.

Considering the above concepts of rank in a multiphase manner, the $i^{th}$ phase rank of a batch at a next node is the rank of the batch after receiving the $i^{th}$ phase packets transmitted by a current node (i.e., the $i^{th}$ phase rank is applicable with respect to a next node receiving packets rather than a current node transmitting packets). It should be appreciated that according to some implementations a next node may receive packets of the same batch from another node (e.g., a node other than a particular current node) in the multi-hop wireless network. The $i^{th}$ phase informative rank of a batch at node A with respect to another node B is the informative rank of the batch at node A (e.g., current node) with respect to node B (e.g., next node) before the start of the $i^{th}$ phase transmission of this batch. It should be appreciated that according to concepts herein, informative rank is with respect to node A being a current node and node B being a next node, and thus informative rank is phase rank information that is informative of a "difference" with respect to the next node. In a situation in which the next node only receives packets from the current node, the $1^{st}$ phase informative rank of a batch is the same as the rank of this batch because the next node has not received any packet of this batch yet. In a situation in which the next node receives packets from the current node and one or more other nodes, the next node may provide multi-phase recoding feedback to each node transmitting packets of a batch to the next node.

In multi-phase recoding operation according to embodiments of the disclosure, a multi-phase recoding feedback packet for the $i^{th}$ phase generated by the next node carries information about the $i^{th}$ phase rank of the batch at the next node. If the next node only receives packets from the current node, then the $i^{th}$ phase rank of this batch may serve this purpose (e.g., the current node may calculate the $(i+1)^{th}$ informative rank from this information). A multi-phase recoding feedback packet of embodiments may, however, include information about the basis of the vector space spanned by the received packets of the batch in the feedback, such as for situations in which the next node receives packets of the same batch from another node (e.g., a node other than a particular current node) in the multi-hop wireless network.

Embodiments of multi-phase recoding implementations in accordance with concepts herein may utilize one or more data fields in a multi-phase recoding feedback packet structure. Multi-phase recoding feedback packets of some embodiments may, for example, include data fields for encoder ID, file ID, batch ID, and $i^{th}$ phase rank information (e.g., information from which the current node can calculate the $i^{th}$ phase rank of the batch, information indicating the $i^{th}$ phase rank, etc.).

In multi-phase recoding operation according to embodiments in which two-way transmission is implemented between a current node and a next node, one or more flags may be introduced or otherwise utilized to distinguish data packets transmitted to the current node from the next node and multi-phase recoding feedback packets transmitted to the current node from the next node. Additionally or alternatively, multi-phase recoding feedback information may be embedded in data packets of transmissions from the next node to the current node, such as by introducing or otherwise utilizing appropriate data fields and flags.

Multi-phase recoding operation according to embodiments of the disclosure may implement various recoding methodologies in the multiple phase framework for recoding and transmission of packets. For example, a multi-phase adaptive recoding implementation may different numbers of recoded packets in one or more phase of multi-phase recoding operation for a BNC batch (e.g., reduced numbers of recoded packets being transmitted in subsequent transmission phases). The ladder diagram of FIG. 3 may, for example, correspond to multi-phase recoding operation in which transmission of a batch from current node 311 to next node 313 adaptively determines a number of packets transmitted during the various transmission phases. Multi-phase adaptive recoding implementations of embodiments may utilize one or more probability metrics based on rank information to determine the number of recoded packets with respect to one or more phase of multi-phase recoding operation for a BNC batch.

To aid in understanding concepts of an example of multi-phase adaptive recoding operation, let E(r, t) be the expected increment of the dimension of the vector space spanned by the received packets at the next node when the informative rank of the batch at the current node before the transmission of the current phase starts is r, and the current node sends t recoded packets of this batch. That is, if the current phase is the $i^{th}$ phase, then r is the $i^{th}$ phase informative rank of the batch before the transmission of the current phase starts. When t is not an integer:

$$E(r,t) = (t-\lfloor t \rfloor)E(r,\lfloor t \rfloor+1) + (1-(t-\lfloor t \rfloor))E(r,\lfloor t \rfloor) \quad (1)$$

From equation (1) above, the fractional part of t is the probability to transmit $\lfloor t \rfloor+1$ packets, otherwise only $\lfloor t \rfloor$ packets are transmitted.

In accordance with some examples, the maximum allowed transmission phases for a multi-phase recoding implementation may be denoted as S. Further, the expected number of recoded packets to be generated for the $i^{th}$ phase may be denoted by $\alpha_i$ and the number of recoded packets to be transmitted for the $i^{th}$ phase when the $i^{th}$ phase informative rank is r may be denoted by $t_{i,r}$. A parameter $t_{avg}$ (e.g., as may be determined by one or more resource allocation procedures) may be set at the current node which represent the average number of recoded packets to be generated among all the transmission phases of a multi-phase recoding implementation. Let $T_i = \{t_{i,0}, t_{i,1}, \ldots, t_{i,M}\}$, where M is the maximum possible rank of the batch.

Multi-phase adaptive recoding for S transmission phases may be modeled as:

$$\max_{\alpha_i \geq 0} \sum_{i=1}^{S} \max_{T_i} \sum_{r_i=0}^{M} P(r_i) E(r_i, t_{i,r_i}) \quad (2)$$

$$\text{s.t.} \sum_{r_i=0}^{M} R(r_i) t_{i,r_i} = \alpha_i \; \forall \; i = 1, 2, \ldots, S, \quad (3)$$

$$\sum_{i=1}^{S} \alpha_i = t_{avg}, \quad (4)$$

where $P(r_i)$ is the probability of a batch at the current node having an $i^{th}$ phase informative rank $r_i$.

When the expected number of recoded packets to be generated for all the phases (i.e., all the $\alpha_i$'s) are known, equations (2) and (3) above can be decomposed into S individual subproblems, wherein each subproblem corresponds to one phase. The $i^{th}$ phase in this example may be modeled as:

$$\max_{T_i} \sum_{r_i=0}^{M} P(r_i) E(r_i, t_{i,r_i}) \quad (5)$$

$$\text{s.t.} \sum_{r_i=0}^{M} P(r_i) t_{i,r_i} = \alpha_i. \quad (6)$$

The subproblem as represented by equations (5) and (6) above has a form as described in "A Unified Adaptive Recoding Framework for Batched Network Coding," referenced above. Such a subproblem may be solved by a greedy algorithm similar to that described in U.S. Pat. No. 10,425, 192, referenced above. Therefore, an approach implemented according to embodiments solves the multi-phase adaptive recoding problem for S transmission phases by trying all the valid combinations of the expected number of recoded packets to be generated for all the phases (i.e., all the $\alpha_i$'s) up to a certain or preselected precision.

After obtaining all the number of recoded packets to be transmitted for the $i^{th}$ phase when the $i^{th}$ phase informative rank is r (e.g., all $T_i$'s), a current node of embodiments may determine the number of recoded packets to be transmitted to the next node after knowing the first phase informative rank of the batch. If the next node only receives packets of this batch from the current node, then the current node may start the first phase transmission after receiving all the packets of this batch which are not dropped. In the case where the current node is the source node, the packets may be received directly from the encoder. When the multi-phase recoding feedback with respect to a transmission phase is lost, so that the current node does not know the $i^{th}$ phase informative rank of a batch, the current node of some examples may send $\alpha_i$ packets for this batch.

To aid in understanding the above concepts, a bisection-like heuristic is provided below for an example of multi-phase adaptive recoding implementing two transmission phases (e.g., S=2), where $\epsilon$ is a threshold parameter for terminating the search, which is also the precision of $\alpha_1, \alpha_2$.

1. Initialize the sets $T_1^{(j)}, T_2^{(j)}$ for j=1, 2, 3
2. $\alpha_{min} \leftarrow 0, \alpha_{max} \leftarrow t_{avg}$
3. If $\alpha_{max} - \alpha_{min} \leq \epsilon$, then return $T_1^{(2)}, T_2^{(2)}$ as the answer
4. $\alpha \leftarrow (\alpha_{min} + \alpha_{max})/2$
5. For j=1, 2, 3, do
   a. $\epsilon' \leftarrow (j-2)\epsilon$
   b. Solve the $1^{st}$ phase subproblem where $\alpha_1 = \alpha + \epsilon'$ to obtain $T_1^{(j)}$ and objective $E_1^{(j)}$
   c. Calculate the distribution of the $2^{nd}$ phase informative rank
   d. Solve the $2^{nd}$ phase subproblem where $\alpha_2 = t_{avg} - (\alpha + \epsilon')$ to obtain $T_2^{(j)}$ and objective $E_2^{(j)}$
   e. $E^{(j)} \leftarrow E_1^{(j)} + E_2^{(j)}$
6. If $E^{(1)} \leq E^{(2)} \leq E^{(3)}$, then $\alpha_{min} \leftarrow \alpha$; otherwise, $\alpha_{max} \leftarrow \alpha$
7. Go to Step 3

Systematic recoding is a further example of a methodologies multi-phase recoding operation according to embodiments of the disclosure may implement in the multiple phase framework for recoding and transmission of packets. As previously described, systematic recoding is a technique that treats received packets of a batch as recoded packets of the batch. Accordingly, in systematic recoding operation according an embodiment of the invention, if a newly received packet is linearly independent of the other received packets of this batch, this packet may be forwarded to the next node directly (e.g., without recoding by a current node). Systematic multi-phase adaptive recoding operation according to some embodiments may, for example, forward r packets as the recoded packets transmitted to the next node when the rank of the batch at the current node is r. For multi-phase operation according to embodiments, in the $i^{th}$ phase, the current node may generate and transmit $r_i$ recoded packets where $r_i$ is the $i^{th}$ phase informative rank. The foregoing operation of embodiments avoids the search of $\alpha_i$ for each phase i.

The systematic multi-phase adaptive recoding problem may be represented as a simplified formulation of the multi-phase adaptive recoding problem above, as set forth below:

$$\max_{T_S} \sum_{r_S=0}^{M} P(r_S)E(r_S, t_{S,r_S}) + \sum_{k=1}^{S-1} \sum_{r_i=0}^{M} P(r_i)E(r_i, r_i) \quad (7)$$

$$\text{s.t.} \sum_{r_S=0}^{M} P(r_s)t_{S,r_S} + \sum_{k=1}^{S-1} \sum_{r_i=0}^{M} P(r_i)r_i = t_{avg}. \quad (8)$$

In systematic multi-phase adaptive recoding operation according to embodiments of the invention, only the last transmission phase (e.g., the $S^{th}$ transmission phase) may transmit a variable number of recoded packets. Accordingly, some embodiments implementing systematic multi-phase adaptive recoding may operate to solve the $S^{th}$ phase subproblem, without solving the subproblem of other phases of the multiple phases.

Figure 4:
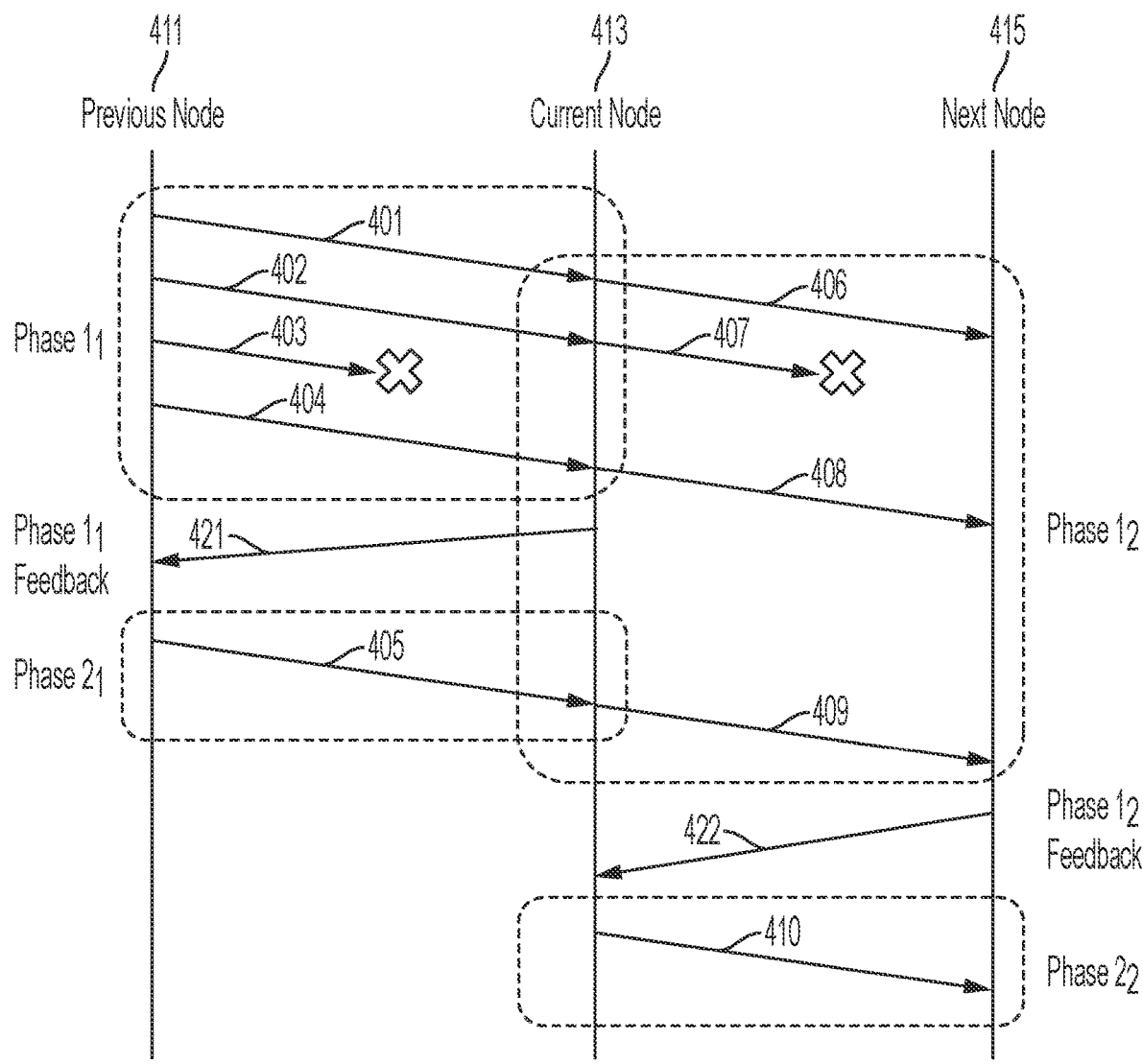
FIG. 4 shows a ladder diagram of multi-phase recoding operation in accordance with aspects of the present disclosure.

FIG. 4 shows a ladder diagram illustrating multiple phase transmission of a batch from a first network node (shown as previous node 411) to a second network node (shown as current node 413) and from the second network node to a third network node (shown as next node 415) in accordance with systematic multi-phase adaptive recoding operation of aspects of the disclosure. Previous node 411, current node 413, and next node 415 may correspond to any respective node of FIG. 1. For example, previous node 411 may correspond to node 112, current node 413 may correspond to node 114, and next node 415 may correspond to node 116 disposed in the data communication path between source node 130 and destination node 140 of the example of FIG. 1. It should be appreciated that the designations "previous node," "current node," and "next node" as shown in the example of FIG. 4 provide descriptors relative to a particular hop of a multi-hop wireless network and are not limiting with respect to the particular nodes within a network that may implement multiple phase transmission techniques in accordance with concepts of the present invention. For example, previous node 411 may be the current node and current node 413 may be the next node in a previous hop of the multiple hops between the nodes of a network (e.g., network 110), while a node not shown in FIG. 4 may be the previous node in the previous hop.

Similar to the example of FIG. 3, in the example of FIG. 4 each arrowed line extending from previous node 411 toward current node 413 (shown as lines 401-405) represents the transmission of a distinct packet (e.g., a coded/recoded packet in accordance with a multi-phase recoding packet structure described above) by previous node 411. Correspondingly, each arrowed line extending from current node 413 toward next node 415 (shown as lines 406-410) represents transmission of a distinct packet (e.g., a coded/recoded packet in accordance with a multi-phase recoding packet structure described above) by current node 413. The arrowed lines encircled by the dotted lines corresponding to a transmission phase represent the packet transmissions during the respective transmission phase. The arrowed lines fully extending from previous node 411 to current node 413 (e.g., lines 401, 402, 404, and 405) each represent a packet that is successfully received by current node 413. Likewise, the arrowed lines fully extending from current node 413 to next node 415 (e.g., lines 406, 408, 409, and 410) each represent a packet that is successfully received by next node 415. The arrowed lines terminating prior to reaching a respective receiving node (e.g., with respect to current node 413, line 403, and with respect to next node 415, line 407, each terminating at an "X") each represent a packet that is lost or dropped.

The multiple phase transmission of the example of FIG. 4 implements two transmission phases (shown as Phase $1_1$ and Phase $2_1$ in the communication between previous node 411 and current node 413 and as Phase $1_2$ and Phase $2_2$ in the communication between current node 413 and next node 415) for systematic multi-phase adaptive recoding operation. For example, the maximum allowed number of transmission phases for the systematic multi-phase adaptive recoding operation of the example of FIG. 4 may be selected or otherwise configured to be two (e.g., S=2). Although the example of FIG. 2 shows a two phase implementation of systematic multi-phase adaptive recoding operation, it should be understood that more transmission phases may be implemented according to embodiments of the present invention.

Systematic multi-phase adaptive recoding implementing two transmission phases presents a special scenario facilitating low latency communication and efficient use of computing resources (e.g., supporting low cost devices having relatively few computational resources). As illustrated in the example of FIG. 4, implementing a systematic recoding technique in the first phase of the multiple phase transmission, the first phase transmission of a batch by a current node (e.g., current node 413) may be started immediately after the current node receives a packet of this batch. For example, the linearly independent received packets are forwarded by current node 413 directly to next node 415 in Phase $1_2$ of the illustrated operation of FIG. 4. In operation according to the illustrated example, the first phase of the multiple phase transmission by current node 413 ends after the current node processed the last received packet of this phase. Accordingly, the second phase of this systematic multi-phase adaptive recoding implementation may be started more quickly as compared with a non-systematic implementation.

Systematic multi-phase adaptive recoding operation according to embodiments of the invention provides for multi-phase recoding operation in which transmission of a batch from a current node to a next node adaptively determines a number of packets transmitted during the various transmission phases. For example, the second phase of the systematic multi-phase adaptive recoding operation illustrated in FIG. 4 may implement adaptive recoding techniques, such as those described above with respect to FIG. 3. Accordingly, multi-phase recoding feedback may be utilized to carry information to a current node about the received packets of a batch at a next node. In the example of FIG. 4, the arrowed line extending from current node 413 toward previous node 411 (shown as line 421) and the arrowed line extending from next node 415 to current node 413 (shown as line 422) represent transmission of multi-phase recoding feedback (e.g., a multi-phase recoding feedback packet in accordance with a multi-phase recoding feedback packet structure described above). Such multi-phase recoding feedback may be provided by a next node of a particular hop so that a current node of that hop can determine (e.g., using techniques as described above) how many recoded packets are to be sent in one or more next phase of the hop.

Figure 5:
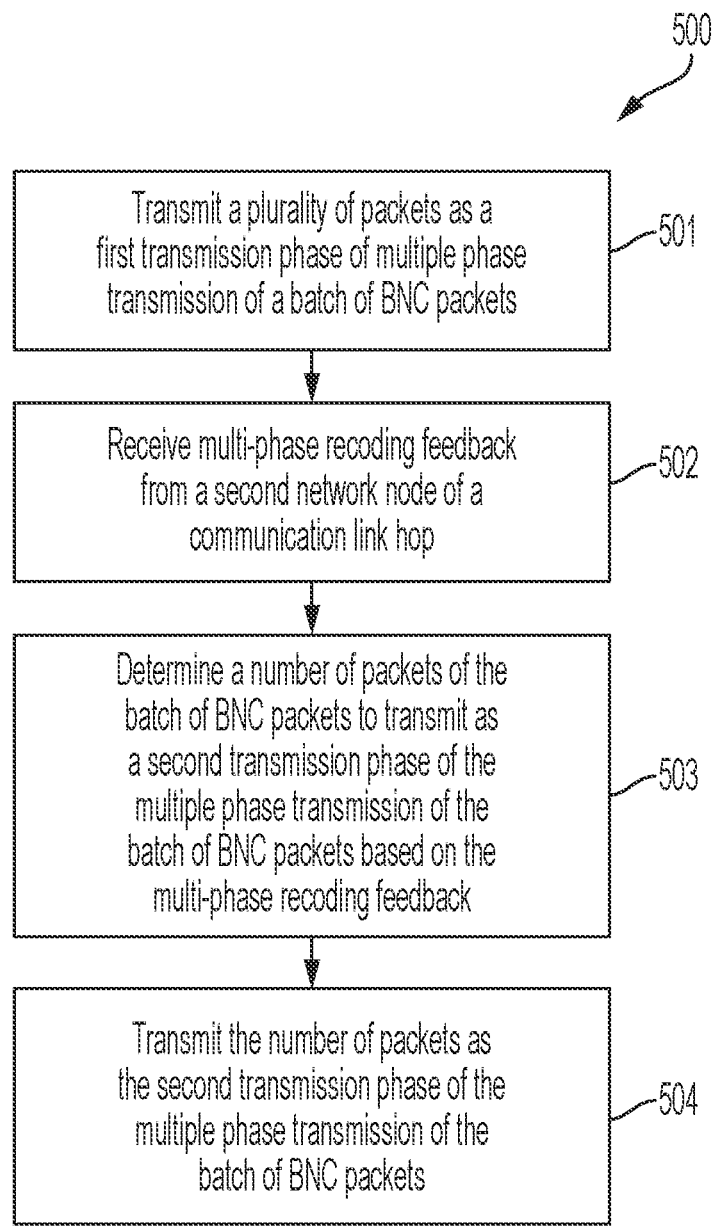
FIG. 5 is a flow diagram of an exemplary process for multi-phase recoding operation by a current node in accordance with aspects of the present disclosure.
Figure 6:
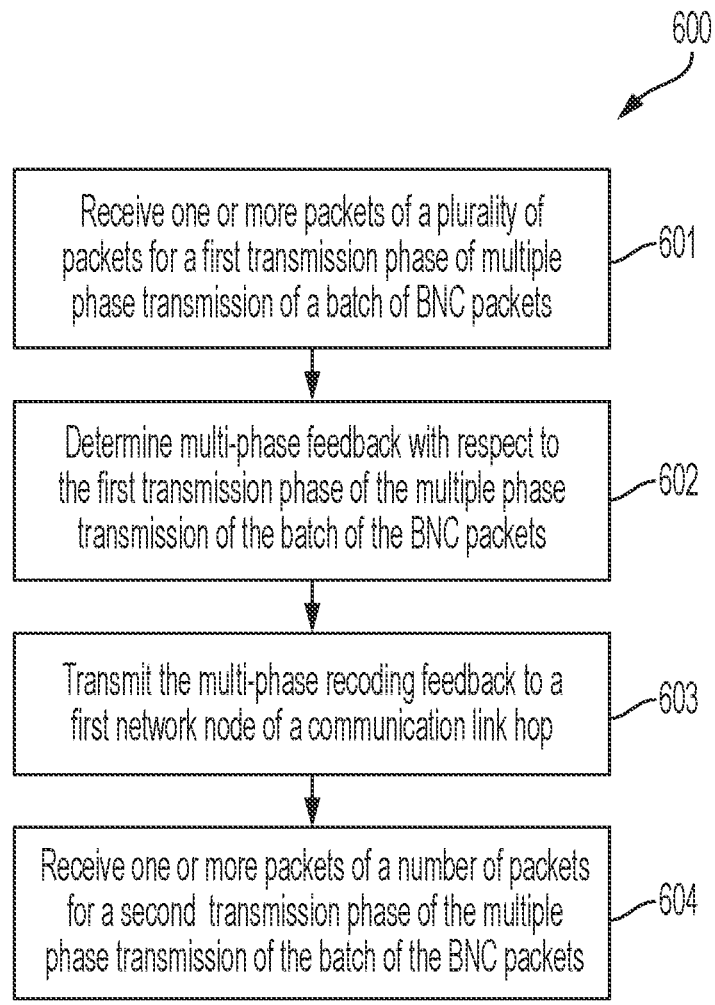
FIG. 6 is a flow diagram of an exemplary process for multi-phase recoding operation by a next node in accordance with aspects of the present disclosure.

FIGS. 5 and 6 illustrate methods for multi-phase recoding operation in accordance with the examples and concepts above. In particular, FIG. 5 shows a flow diagram of exemplary multi-phase recoding operation by a first network node (e.g., current nodes 311, 413, etc.) in accordance with aspects of the present disclosure. Correspondingly, FIG. 6 shows a flow diagram of exemplary multi-phase recoding operation by a second network node (e.g., next nodes 313, 415, etc.) in accordance with aspects of the present disclosure.

Figure 7:
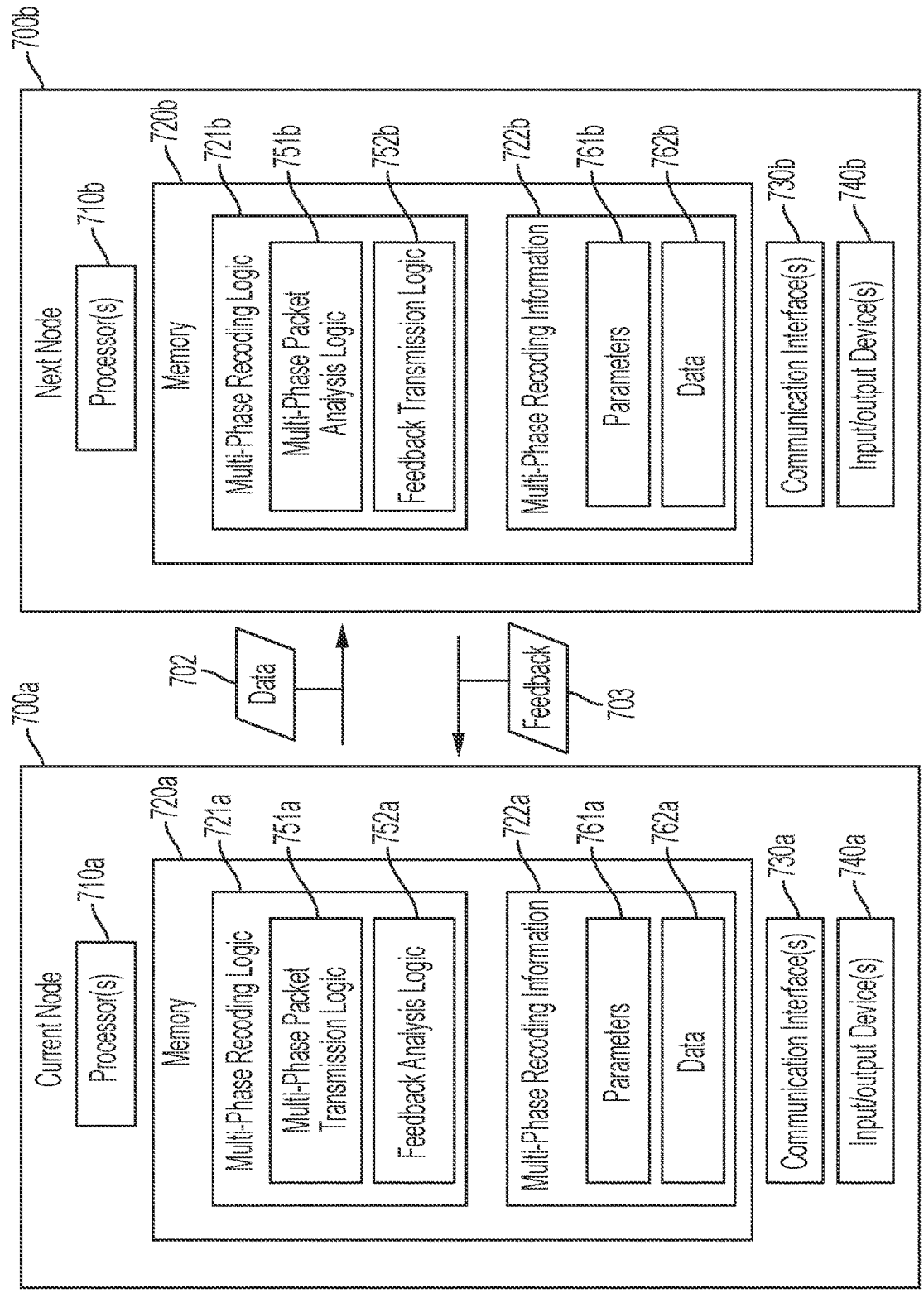
FIG. 7 shows block diagrams of a current node and a next node configured for multi-phase recoding operation in accordance with aspects of the present disclosure.

The operation of flow 500 of FIG. 5 and flow 600 of FIG. 6 may, for example, be performed by or under control of one or more processors of a processor-based platform (e.g., an instance of node 200 in FIG. 2) executing instructions of multi-phase recoding logic. For example, node 700a of FIG. 7 may provide a processor-based instance of a first network node (e.g., current node) configured for operation according to flow 500 of FIG. 5 and node 700b of FIG. 7 may provide a processor-based instance of a second network node (e.g., next node) configured for operation according to flow 600 of FIG. 6.

Node 700a of the illustrated example includes one or more processors 710a, memory 720a, one or more communication interfaces 730a, and one or more I/O devices 740a, such as may correspond to processor(s) 210, memory 220, communication interfaces 230, and I/O device(s) 240 of node 200 described above. Similarly, node 700b of the illustrated example includes one or more processors 710b, memory 720b, one or more communication interfaces 730b, and one or more I/O devices 740b, such as may correspond to processor(s) 210, memory 220, communication interfaces 230, and I/O device(s) 240 of node 200 described above. Further, nodes 700a and 700b of the illustrated example include multi-phase recoding logic 721a (shown as including multi-phase packet transmission logic 751a and feedback analysis logic 752a) and 721b (shown as including multi-phase packet analysis logic 751b and feedback transmission logic 752b), stored by memory 720a and 720b respectively, configured to facilitate operations and functionality of multi-phase recoding operation according to concepts of the present invention. For example, when executed by one or more processors of a respective node, the one or more processors are caused to perform operations of a corresponding one of flows 500 and 600. Memory 720a and 720b of the example of FIG. 7 further includes multi-phase recoding information 722a (shown as including parameters 761a and data 762a) and 722b (shown as including parameters 761b and data 762b), such as may store data, parameters, values, file structures, buffer contents, queue contents, databases, and/or the like configured to facilitate multi-phase recoding operation according to concepts of the present invention.

Nodes 700a and 700b may correspond to various nodes (e.g., any of nodes 112-122, 130, and 140 of FIG. 1) of a multi-hop wireless network (e.g., network 110). For example, nodes 700a and 700b may correspond to intermediate nodes of a multi-hop network facilitating communication between source and destination nodes (e.g., source node 130 and destination node 140) via multiple hops. According to some examples, node 700a may correspond to a source node (e.g., source node 130) of a multi-hop communication, while node 700b may correspond to an intermediate node (e.g., any nodes 112-122) of the multi-hop communication. According to another example, node 700a may corresponding to an intermediate node (e.g., any nodes 112-122) of a multi-hop communication, while node 700b may correspond to a destination node (e.g., destination node 140) of the multi-hop communication.

In operation according to flows 500 and 600, described in more detail below, data 702 is transmitted from node 700a to node 700b. Data 702 may, for example, comprise a file or some portion thereof communicated between a source node and a destination node via nodes of a multi-hop wireless network. It should be understood that, although data 702 is illustrated as a single logical block for simplicity, data 702 is transmitted as a plurality of coded/recoded input packets (i.e., data 702 comprises distinct coded/recoded packets for a batch of input packets) according to multi-phase recoding operation of embodiments herein.

Further, in operation according to flows 500 and 600, feedback 703 is transmitted from node 700b to node 700a. Feedback 703 may, for example, comprise multi-phase recoding feedback configured to carry information to the current node about the received packets of the batch at the next node. Feedback 703 of embodiments may be provided by node 700b according to flow 600 so that node 700a can determine how many recoded packets are to be sent according to flow 500 in a subsequent phase.

Referring to FIG. 5, multi-phase recoding operation with respect to packets of a BNC batch according to flow 500 as implemented by a current node, such as node 700a, is shown. At block 501 of the illustrated example, the first network node transmits a plurality of packets as a first transmission phase of multiple phase transmission of a batch of the BNC packets. For example, node 700a operating as a current node of a communication link hop in a multi-hop wireless network may operate under control of multi-phase recoding logic 721a to transmit a plurality of packets of a first transmission phase of a multiple phase transmission for a batch of the BNC packets. The packets of some examples may comprise data stored as multi-phase recoding information (e.g., some portion of data 762a, such as may comprise portions of a file divided into input packets for communication as BNC batches, BNC encoded packets received from a previous node, etc.). The packets of the transmission phase may, for example, comprise packets of data 702 coded/recoded by multi-phase packet transmission logic 751a (e.g., using and/or in accordance with one or more aspects of parameters 761a) according to a multi-phase recoding technique implemented by multi-phase recoding logic 721a.

In accordance with some embodiments, a multi-phase recoding technique implemented by multi-phase packet transmission logic 751a may provide a multi-phase adaptive recoding implementation, such as to facilitate different numbers of recoded packets in one or more phase of multi-phase recoding operation for a BNC batch optimizing the number of packets for different transmission phases (e.g., providing intra-batch adaptive coding/recoding). For example, multi-phase adaptive recoding operation may provide for at least one of the first transmission phase and/or a subsequent transmission phase implementing adaptive recoding with respect to packets transmitted in that phase.

In accordance with further embodiments, a multi-phase recoding technique implemented by multi-phase packet transmission logic 751a may provide a systematic multi-phase recoding implementation, such as to facilitate transmitting linearly independent packets of the received packets as recoded packets in one or more phase of multi-phase recoding operation for a BNC batch reducing latency (e.g., providing intra-batch systematic coding/recoding). For example, systematic multi-phase recoding operation may provide for at least one of the first transmission phase and/or a subsequent transmission phase implementing systematic recoding with respect to packets transmitted in that phase.

In accordance with still further embodiments, a multi-phase recoding technique implemented by multi-phase packet transmission logic 751a may provide a systematic multi-phase adaptive recoding implementation, such as to facilitate transmitting linearly independent packets of the received packets as recoded packets reducing latency and to facilitate different numbers of recoded packets in one or more phase of multi-phase recoding operation for a BNC batch optimizing the number of packets for different transmission phases (e.g., providing intra-batch systematic and adaptive coding/recoding). For example, systematic multi-phase adaptive recoding operation may provide for at least one of the first transmission phase and/or a subsequent transmission phase implementing systematic recoding with respect to packets transmitted in that phase and for at least one of the first transmission phase and/or a subsequent transmission phase implementing adaptive recoding with respect to packets transmitted in that phase.

Irrespective of particular multi-phase recoding operation implemented for the transmission of the plurality of packets as the first transmission phase at block 501 of flow 500, each packet of the plurality of packets for the first transmission phase transmitted according to some embodiments may be transmitted in a multi-phase recoding packet structure including data fields for encoder ID and/or file ID, such as may be populated using information of parameters 761*a* and/or data 762*a*. The multi-phase recoding packet structure of some embodiments may additionally or alternatively include data fields for packet ID and a number of recoded packets, such as may be populated using information of parameters 761*a* and/or data 762*a*.

Referring now to flow 600 of FIG. 6 as implemented by a next node, such as node 700*b*, multi-phase recoding operation in correspondence to the operation of flow 500 of FIG. 5 is shown. At block 601 of the illustrated example, the second network node receives one or more packets of a plurality of packets for a first transmission phase of multiple phase transmission of a batch of the BNC packets. For example, node 700*b* operating as a next node of the communication link hop in the multi-hop wireless network may operate under control of multi-phase recoding logic 721*b* to receive packets of the plurality of packets of the first transmission phase of the multiple phase transmission for the batch of the BNC packets transmitted by node 700*a*. The received packets of some examples may be stored as multi-phase recoding information (e.g., some portion of data 762*b*, such as for further processing, recoding, etc. by node 700*b*). As described above, the packets of the transmission phase may be coded/recoded according to a multi-phase recoding technique implemented by multi-phase packet transmission logic 751*a* of node 700*a*.

Continuing with the exemplary operation of flow 600, at block 602 the second network node determines multi-phase recoding feedback with respect to the first transmission phase of the multiple phase transmission of the batch of the BNC packets. For example, the one or more packets of the transmission phase received by node 700*b* may be analyzed (e.g., using and/or in accordance with one or more aspects of parameters 761*b*) by multi-phase packet analysis logic 751*b* of multi-phase recoding logic 721*b* to determine information about the received packets of the batch at node 700*b*, such as may be utilized by node 700*a* in determining how many recoded packets are to be sent in a subsequent phase of multi-phase recoding operation. In accordance with some examples, the information about the received packets of the batch may comprise rank information regarding the dimension of the vector space spanned by the coefficient vectors of packets of the batch. The information regarding packets of the first transmission phase received at the second network node may, for example, include phase rank information with respect to the batch of the BNC packets at the second network node.

At block 603 of the illustrated example of flow 600, the second network node transmits the multi-phase recoding feedback to a first network node of the communication link hop. For example, node 700*b* may operate under control of multi-phase recoding logic 721*b* to transmit one or more multi-phase recoding feedback packets with respect to the transmission phase to node 700*a*. The multi-phase recoding feedback packets of the transmission phase may, for example, comprise packets of feedback 703 transmitted according to a multi-phase recoding technique implemented by multi-phase recoding logic 721*a*. Packets of the one or more multi-phase recoding feedback packets may comprise information about the received packets of the batch at node 700*b*, such as may include rank information regarding the dimension of the vector space spanned by the coefficient vectors of packets of the batch (e.g., phase rank information with respect to the batch of the BNC packets at the second network node). The one or more packets of the multi-phase recoding feedback packets transmitted according to some embodiments may be transmitted in a multi-phase recoding feedback packet structure including data fields for encoder ID, file ID, batch ID, and/or phase rank information, such as may be populated using information of parameters 761*b* and/or data 762*b*.

Referring again to flow 500 of FIG. 5, at block 502 the first network node receives multi-phase recoding feedback from the second network node of the communication link hop. For example, node 700*a* operating under control of multi-phase recoding logic 721*a* may receive the one or more multi-phase recoding feedback packets transmitted by node 700*b*. The received multi-phase recoding feedback packets of some examples may be stored as multi-phase recoding information (e.g., some portion of data 762*a*, such as for further processing, coding/recoding packets, etc. by node 700*a*). As described above, packets of the one or more multi-phase recoding feedback packets may comprise information about the received packets of the batch at node 700*b*.

At block 503 of the illustrated example of flow 500, the first network node determines a number of packets of the batch of BNC packets to transmit as a second transmission phase of the multiple phase transmission of the batch of the BNC packets based on the multi-phase recoding feedback. For example, one or more multi-phase recoding feedback packets received by node 700*a* may be analyzed (e.g., using and/or in accordance with one or more aspects of parameters 761*a*) by feedback analysis logic 752*a* of multi-phase recoding logic 721*a* to determine how many coded/recoded packets are to be sent in the next phase of the multi-phase recoding operation. For example, multi-phase adaptive recoding implementations may adaptively determine a number of packets transmitted during the various transmission phases based upon multi-phase recoding feedback. In operation according to some embodiments, feedback analysis logic 752*a* may utilize probability metrics based on rank information to determine the number of recoded packets with respect to one or more phase of multi-phase recoding operation for a BNC batch.

Continuing with the exemplary operation of flow 500, at block 504 the first network node transmits the number of packets as the second transmission phase of the multiple phase transmission of the batch of BNC packets. For example, node 700*a* may operate under control of the multi-phase recoding logic 721*a* to transmit one or more packets of a second transmission phase of the multiple phase transmission for the batch of the BNC packets, wherein the number of packets comprising the one or more packets transmitted is the number determined based on the multiphase recoding feedback. As described above with respect to the first transmission phase, the packets of the second transmission phase may comprise data stored as multi-phase recoding information (e.g., some portion of data 762a, such as may comprise portions of a file divided into input packets for communication as BNC batches, BNC encoded packets received from a previous node, etc.). The packets of the transmission phase may comprise packets of data 702 coded/recoded by multi-phase packet transmission logic 751a (e.g., using and/or in accordance with one or more aspects of parameters 761a) according to the multi-phase recoding technique implemented by multi-phase recoding logic 721a.

Referring again to flow 600 of FIG. 6, at block 604 the second node receives one or more packets of the number of packets for the second transmission phase of the multiple phase transmission of the batch of the BNC packets. For example, node 700b may operate under control of multi-phase recoding logic 721b to receive one or more packets of the number of packets of the second transmission phase of the multiple phase transmission for the batch of the BNC packets transmitted by node 700a. The received packets of some examples may be stored as multi-phase recoding information (e.g., some portion of data 762b, such as for further processing, recoding, etc. by node 700b). As described above, the packets of the transmission phase may be coded/recoded according to a multi-phase recoding technique implemented by multi-phase packet transmission logic 751a of node 700a.

Although the example flows of FIGS. 5 and 6 are shown for first and second transmission phases, it should be appreciated that the methods for multi-phase recoding operation may implement more transmission phases (e.g., 3, 4, 5, etc.) than shown in the illustrated embodiment. For example, a maximum allowed number of transmission phases for multi-phase recoding operation may be selected or otherwise configured (e.g., as a value of maximum transmission phases S parameter, stored in parameters 761a and/or 761b). Where a transmission phase subsequent to a second transmission phase is implemented, operation according to flow 500 may return to block 502 after block 504 and flow 600 may return to block 601 after block 604 for each subsequent transmission phase. Multi-phase recoding operation for a particular batch of BNC packets may, according to some embodiments, end transmission of the batch of BNC packets by the first network node when a transmission phase of the multiple phase transmission of the batch of the BNC packets exceeds a maximum allowed number of transmission phases, or when the first network node has no further packets with linearly independent coefficient vectors are available for transmission (e.g., whichever occurs first). For example, at block 504, multi-phase packet transmission logic 751a may compare a transmission phase counter register of parameters 761a with a maximum transmission phases parameter of parameters 761a to determine if a subsequent transmission phase is to be implemented according to the multi-phase recoding operation. Additionally or alternatively, at block 504, multi-phase packet transmission logic 751a may compare packets of the batch transmitted in one or more transmission phases with additional packets for the batch in data 762a to determine if any packets with linearly independent coefficient vectors with respect to the already transmitted packets for the batch remain available for transmission.

In multi-phase recoding operation according to embodiments of the invention, a network node may transmit a packet of a second batch when there is nothing to send for a first batch at a certain timeslot, such as to facilitate efficient utilization of the network node. Accordingly, all the packets of a particular batch may not be transmitted before one or more packets of another batch are transmitted. In multi-phase recoding operation according to the foregoing the arrival of a packet of a new batch may not signify that all the packets of the current batch that are not lost have already been received.

Network nodes providing multi-phase recoding operation according to embodiments of the invention may be configured to implement various aspects of batch management, such as to organize the batches and files, keep track of and update the timeout of the batches and the files, discard and/or recode the outdated batches and files, etc. For example, a batch management system may be implemented by multi-phase recoding logic (e.g., multi-phase recoding logic 721a and/or 721b) of various nodes of a multi-hop wireless network in which multi-phase recoding is utilized.

Embodiments of batch management provided according to aspects of the invention may implement one or more techniques to trigger the recoding process of a batch. For example, some embodiments of multi-phase recoding operation may implement a timeout approach (referred to herein as "timeout recoding") with respect to multiple phase BNC communication. According to some examples, recoding of the packets of a batch and/or other aspects of processing packets of a batch according to timeout recoding operation of examples of the invention may be triggered or initiated by a network node (e.g., next node) based upon a timeout with respect to the batch. One or more exceptions to timeout recoding may be implemented to facilitate recoding of the packets of a batch prior to a timeout with respect to the batch, such as to avoid unneeded or undesired delay in the recoding operation. As an example of an exception to timeout recoding. once the received batch has full rank, the network node of embodiments may start recoding the batch immediately (i.e., once the batch has full rank, any packet of this batch further received must be linearly dependent of the already received packets of this batch).

In timeout recoding operation according to an example, a timestamp is recorded (e.g., in parameters 761a and/or 761b) for each batch at a network node. According to embodiments, this timestamp is updated when a packet of this batch is received by the network node. Accordingly, the timestamp may be considered as recording the "freshness" of the batch. Upon the elapse of an amount of time specified by a timeout value (e.g., stored in parameters 761a and/or 761b) after the latest timestamp of a batch, the recoding process of this batch may be triggered. In operation according to some examples, after the last recoding phase, the batch may be discarded. Similarly, in timeout recoding operation according to an example, a timestamp is recorded (e.g., in parameters 761a and/or 761b) for each file, such as to facilitate the network node discarding outdated files.

To facilitate batch management operation to organize the batches and files, keeping track of and updating the timeout of the batches and the files, and discarding and/or recoding the outdated batches and files, multi-phase recoding logic of embodiments of the invention may implement various data structures. For example, Multi-phase recoding logic configured for batch management operation of some examples may implement one or more timeout heaps, a batch structure, and a file structure, as described in more detail below. Multi-phase recoding logic configured for batch management operation may, according to embodiments, also implement a data structure for mapping each encoder ID-file ID pair to the corresponding file structure (e.g., using a hash table).

Batch management operation according to embodiments of the invention may, for example, utilize one or more timeout heap to keep track of the timeout events for triggering timeout recoding and removing old-aged files. Although an embodiment may implement a timeout thread for each timeout event, such an implementation would result in a large number of threads (e.g., the maximum number of threads allowed per process may be reached when there are many batches and files in a high-volume traffic scenario). Accordingly, batch management operation provided according to embodiments implementing timeout heaps in accordance with aspects of the present disclosure facilitates threads handling multiple timeout events.

In implementing timeout heaps according to embodiments of the invention, each thread may have a timeout value x and an indexed priority queue (e.g., a priority queue where each node has a cross-reference to the data in another data structure for cross-updating purpose), where each item (also called a node in the sense of trees) in the queue is associated with a batch or a file. Such an indexed priority queue of embodiments is referred to herein as a "timeout heap" (e.g., in light of implementation of a priority queue being a binary heap), and there can be multiple instances of timeout heaps for different types of timeout events.

Figure 8:
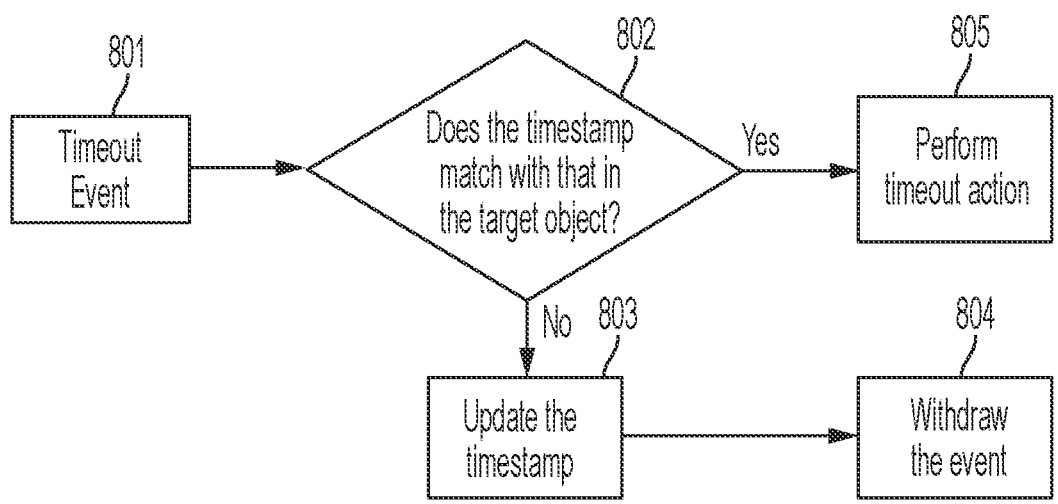
FIG. 8 is a flow diagram of operation of a timeout heap in accordance with aspects of the present disclosure.

According to examples, the key of each node of the timeout heap (indexed priority queue) is a timestamp. In a timeout technique to keep track of timeout events for triggering timeout recoding and removing old-aged files according to embodiments, the thread may query the earliest timestamp t in the timeout heap. For example, let the earliest timestamp t in a timeout heap correspond to a batch/file b. In operation according to an example, if the current time (now) is not yet t+x (i.e., the sum of the earliest timestamp and a corresponding timeout value), a timeout event is not is not present and timeout processing for the thread may sleep till t+x. However, as represented by the functional blocks of FIG. 8, if the current time is no earlier than t+x, then a timeout event may be present (block 801) and the thread may proceed to check whether the most recent timestamp of b equals t (block 802). If the timestamps do not match, the timestamp of b has been updated and the thread may proceed to update this timestamp to the queue item (block 803) and withdraw the timeout event (block 804). If the timestamps match, then the thread may proceed to perform timeout action (e.g., trigger recoding, delete the batch, delete the file, etc.) of b (block 805). The correctness of the timeout event processing is facilitated by the monotonic increasing nature of the timestamp updates of this example. Using the "lazy evaluation," methodology of the example, the timeout technique does not need to frequently update the timestamps in the timeout heap when the timestamp of an individual batch or file is updated.

In a situation where the timeout heap (indexed priority queue) is empty, the thread may sleeps for x units of time as there is no timeout event within x units of time. However, in operation according to embodiments, this sleep may be interrupted when there is a new item added to the timeout heap. Although the timeout event of this new item should not be triggered immediately as the timestamp would be the current time, in practice the computational time and the scheduling of the threads may lead to an immediate timeout event. Accordingly, embodiments provide for interruption of the sleep in this situation.

Batch management operation according to embodiments of the invention may utilize one or more batch and/or file structures to keep track of, update, discard, recode, etc. the batches and/or files. A batch belongs to a file, and thus the structure for the file implemented according to embodiments may be used for mapping the batch ID to the structure for batches for the file. A pointer (e.g., in parameters 761a and/or 761b) may be utilized according to embodiments for cross-referencing the structure for the file.

A batch structure (e.g., within data 762a and/or 762b) may be implemented by multi-phase recoding logic of embodiments herein for storing the received packets of a batch (e.g., in data 762a and/or 762b). An exemplary batch structure as may be utilized in multi-phase recoding according to embodiments of the invention is shown generally in FIG. 9 as batch structure 900.

Figure 9:
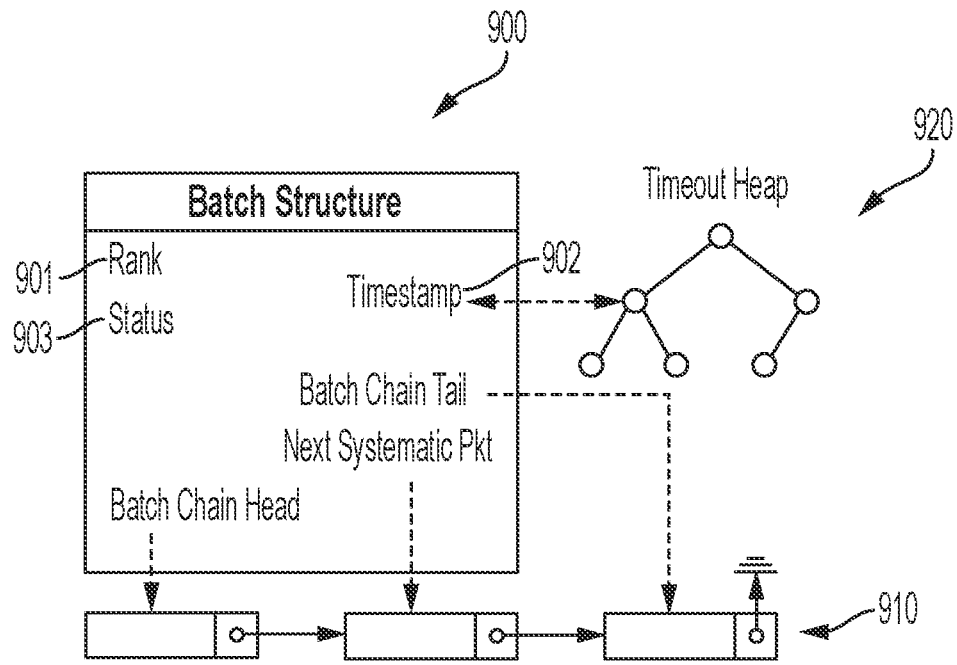
FIG. 9 is a block diagram of a batch structure in accordance with aspects of the present disclosure.

To reduce the number of packet copying, batch structure 900 implements a linked-list-like data structure (see e.g., "A Protocol Design Paradigm for Batched Sparse Codes," referenced above, for an example of a linked list). Such linked-list like data structure of embodiments is referred to herein as a "chained list" (e.g., in light of it chaining the packets belonging to the same batch in a way so that the packets may be accessed one by one). A chained list of packets for a batch is shown in FIG. 9 as chained list 910. It should be understood that concepts of the present invention do not restrict the structure for storing packets.

In multi-phase recoding operation according to embodiments, after a network node receives a packet, the encoder ID and file ID (collectively referred to herein as the "EFID") may be used to identify or locate the file structure. The batch ID may then be used to identify or locate the batch structure from the file structure. Using this batch ID, the packet may be added to the chained list of in the batch structure (e.g., added to chained list 910 of batch structure 900).

Multi-phase recoding operation to generate a recoded packet may scan through the chained list for the batch and calculate the random linear combination. For systematic recoding, where received packets are regarded as part of the recoded packets, multi-phase recoding logic of embodiments may utilize one more pointers (e.g., in parameters 761a and/or 761b) for locating a next systematic packet in the chained list.

In addition to storing the packets for a batch, a batch structure of embodiments may record the rank of the batch (e.g., rank 901), such as for use in determining the number of recoded packets to be generated. A batch structure of some embodiments may additionally store a timestamp to record the freshness of the batch (e.g., timestamp 902), such as for use in triggering timeout recoding, removing old-aged files, etc. When a packet is added to the batch, the timestamp may be updated to the current time. If the batch has an old age (e.g., timeout expired), the recoding process of this batch may be triggered by a corresponding timeout heap (e.g., timeout heap 920).

In accordance with some embodiments, one or more status variables (e.g., status 903) may be used to identity whether the batch is waiting to be discarded, to record the number of recoded phases, etc. For example, after the last recoding transmission phase of the batch is completed, a status variable for the batch may be marked as expiring. When the batch structure is designated as in an expiring status, the packets in the chained list may be deallocated in operation according to some examples. Such an expiring status may, for example, facilitate the multi-phase recoding operation handling out-of-order packets that arrive at the network node after the recoding is done. Where the batch structure for the batch remains in an expiring status, these late packets will be not considered as being from a new batch (i.e., they will be associated with the expiring batch).

Embodiments of a batch structure may utilize a timeout heap for expiring batches. The batch structure may, for example, be deallocated after a timeout event determined by the timeout heap. The timeout value for an expiring batches timeout heap may be longer than that used by a previous network node, such as to avoid a situation in which the network node receives a packet of this batch after deallocation of the batch structure. It should be appreciated that the number of hops between a current node and the source node of the batches can be different. Accordingly, embodiments may not use a fixed timeout value for expiring batches at the network node. Some embodiments may, for example, calculate the expiring batches timeout value dynamically, such as based on the number of hops the packet of the batch has gone through. This information may be inferred by the time to live (TTL) data field (e.g., in the IP header) in operation according to embodiments. For example, when a source node uses the same TTL for its transmitted packets, the difference between the source TTL and the current TTL may provide a value relative to the number of hops the packet has been passed. Embodiments of the invention may scale the expiring batches timeout value to be used according to this difference.

Figure 10:
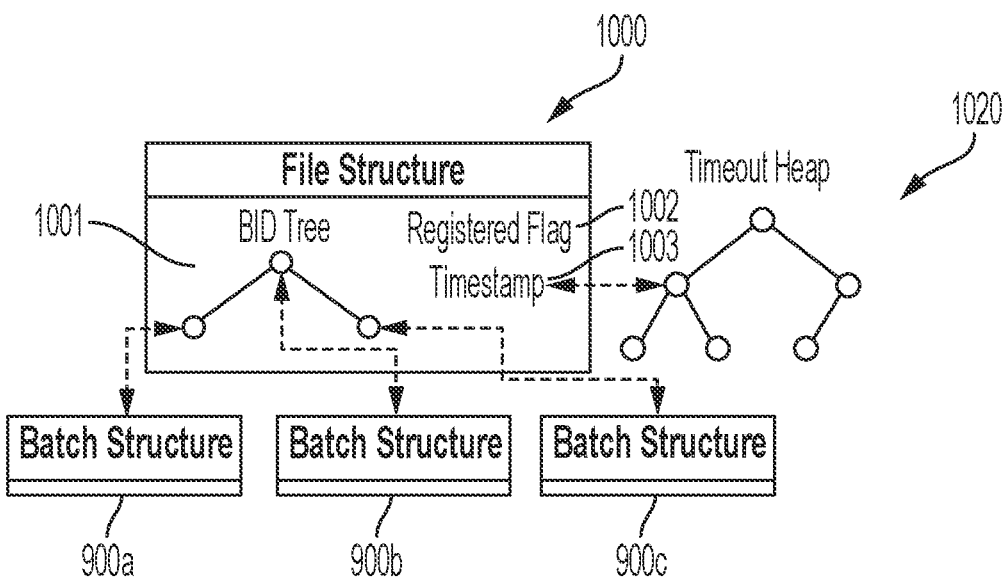
FIG. 10 is a block diagram of a file structure in accordance with aspects of the present disclosure.

A file structure (e.g., within data 762a and/or 762b) may be implemented by multi-phase recoding logic of embodiments herein for managing the received batches of a file. An exemplary file structure as may be utilized in multi-phase recoding according to embodiments of the invention is shown generally in FIG. 10 as file structure 1000.

A structure for managing a file according to examples herein may comprise a data structure with batch ID as a key. Although a batch may be discarded after a designated number of recoded packets have been transmitted to a next node, one or more packets of the batch may be received after the batch is discarded (e.g., due to buffering or out-of-order issues). Multi-phase recoding operation according to embodiments of the invention may be configured to avoid such late packets being identified as a new batch. For example, a file structure of some embodiments may be configured to keep certain information about the discarded batch for some period of time. Moreover, a network node may not receive the batches in sequential order (e.g., due to interleaving), and thus the ages of the batches may not be sorted by batch IDs. Accordingly, a file structure of embodiments may be configured to facilitate accessing and removing batches of arbitrary batch IDs efficiently.

It should be appreciated that the number of batches to be handled by a network node can variate significantly, such as depending on the volume of the traffic, the timeout for discarding a batch from the structure, etc. Although a very large direct access table may be created to realize random access of batches, direct access tables are not scalable with the number of files in the buffer. In situations where there are only a few batches most of the time, embodiments of a file structure may implement a linked list, whereby a sequential search is implemented to locate a batch. Some embodiments of a file structure herein may implement a self-balancing binary search tree is a possible choice.

Irrespective of the particular search implementation, each node in a file structure of embodiments of the invention has a key (e.g., batch ID) and a pointer to the batch structure of the corresponding batch. For example, file structure 1000 is shown as including batch ID (BID) tree comprising nodes having a batch ID and a pointer to respective ones of batch structures 900a, 900b, 900c, etc. (e.g., each of batch structures 900a, 900b, and 900c may comprise an instance of batch structure 900 of FIG. 9 described above).

Multi-phase recoding operation according to embodiments may record the moment when there is no more batch in the BID tree of a file structure. For example, if all the received batches of this file have been recoded and there is no newly received packet of this file for a period of time, the file structure may be deallocated according to some examples. File structure 1000 of the illustrated example may utilize timeout heap 1020 for this purpose. In operation according an example, the file may be registered to the timeout heap when there is no more batch in the BID tree. However, a new packet of this file may be received late (e.g., after the BID tree has been determined to no longer have batches associated therewith), whereby the empty BID tree becomes non-empty again. If a timestamp records the moment the BID tree becomes empty, this timestamp is no longer valid after receipt of a late packet. A file structure of embodiments of the invention may be configured to resolve this issue. For example, file structure 1000 includes registered flag 1002 to record whether this file is registered in the timeout heap. Timestamp 1003 of file structure 1000 may be used record the last moment a batch is added or removed to/from the BID tree. When the timeout heap triggers a timeout event, the timestamps in the timeout heap and the file structure may be compared to determine if there is a match. If not, this file may be unregistered from the timeout heap, and the file may be re-registered later when there is again no batch in the BID tree. However, if there is a match, timeout action (e.g., deleting the file) may be performed.

As can be appreciated from the foregoing, multi-phase recoding operation as may be implemented by network nodes of the network 110 represent a significant improvement for multi-hop wireless networks. Moreover, multi-phase recoding utilized by nodes of the network 110 enable the nodes to be deployed with fewer computational resources (e.g., lower memory and CPU resources) than may be required to achieve the same throughput using other BNC transmission techniques, including standard BNC and RLNC transmission techniques. Such capabilities may enable many of the use cases for which multi-hop wireless networks are currently being considered to be realized. For example, smart city applications may require hundreds or even thousands of sensors to be deployed in noisy environments and/or environments where wireless connectivity may be needed. Such constraints may limit the ability to utilize wired networks that may be more resilient to the noisy environments likely to be encountered, resulting in the need for communication between the sensors and devices via wireless communication links. Moreover, such smart city applications are likely to involve a large amount of traffic related to transmission of small file sizes, which are prone to error and likely to result in performance degradation using traditional communication techniques, such as BNC and RLNC. However, the multi-hop recoding techniques disclosed herein mitigate these drawbacks. To illustrate, the encoding techniques disclosed herein provide intra-batch systematic and adaptive coding/recoding based on feedback from a next node carrying information about the received packets of the batch at the next node, which improves reduced throughput, reduces latency, and/or optimizes operation with respect to other network communication metrics. Additionally, by leveraging BNC-based encoding schemes, the network may be more resilient to noisy environments. Thus, embodiments of the present disclosure are well-suited to support smart city applications.

In addition to smart city applications, the multi-phase recoding transmission techniques disclosed herein may also be readily utilized in other use cases and applications. For example, with the continued interest in IoT, it is becoming increasingly more common for deployments to utilize smaller, lower power or battery operated devices instead of more powerful and larger devices in many situations. The multi-phase recoding techniques disclosed herein are particularly well suited for use in such deployments due to the reduced computational complexity and memory (e.g., buffer) requirements afforded by the present invention. It is noted that the exemplary use cases and deployment options described above have been provided for purposes of illustration, rather than by way of limitation and that the transmission techniques disclosed herein may be readily utilized in any use case or scenario in which increased throughput and lower computational and power requirements may be desired.

It is noted that while many of the examples illustrated and described above have been described as utilizing 2 or 3 phases, more than 3 phases may be utilized in accordance with aspects of the present disclosure. However, it is noted that the particular number of phases utilized presents a trade-off between throughput, storage, and latency. For example, additional phases (i.e., more than 3 phases) require a network node to store the packets of the batches for a longer time, thereby increasing memory usage and memory requirements, especially when network nodes use a large number of phases while experiencing very high traffic. Also, latency may be increased as if the network node has to wait for the feedback. However, utilizing 2, 3, or more phases may be beneficial in some instances, such as if the loss rate is high, where the extra phases can help to increase the throughput significantly. Furthermore, while any number of phases may be utilized according to specific implementations, network conditions (e.g., traffic, noise/loss, etc.), in most scenarios 2 or 3 phases should prove sufficient.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-10, include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method for communicating batches of batched network coding (BNC) packets between network nodes of a multi-hop wireless network, the method comprising:
   transmitting, under control of multi-phase recoding logic of a first network node of a communication link hop in the multi-hop wireless network, a plurality of packets as a first transmission phase of multiple phase transmission of a batch of the BNC packets;
   receiving, under control of the multi-phase recoding logic, multi-phase recoding feedback from a second network node of the communication link hop;
   determining, by the multi-phase recoding logic, a number of packets of the batch of BNC packets to transmit as a second transmission phase of the multiple phase transmission of the batch of the BNC packets based on the multi-phase recoding feedback; and
   transmitting, under control of the multi-phase recoding logic, the number of packets as the second transmission phase of the multiple phase transmission of the batch of BNC packets.

2. The method of claim 1, wherein the multi-phase recoding feedback comprises information regarding packets of the first transmission phase received at the second network node.

3. The method of claim 2, wherein the information regarding packets of the first transmission phase received at the second network node includes phase rank information with respect to the batch of the BNC packets at the second network node.

4. The method of claim 2, wherein the multi-phase recoding feedback is received in a multi-phase recoding feedback packet structure including data fields for encoder identification (ID), file ID, batch ID, and phase rank information.

5. The method of claim 1, wherein the transmitting the first transmission phase and the transmitting the second transmission phase are in accordance with multi-phase adaptive recoding operation in which at least one of the first transmission phase or the second transmission phase implements adaptive recoding with respect to packets transmitted in that phase.

6. The method of claim 1, wherein the transmitting the first transmission phase and the transmitting the second transmission phase are in accordance with systematic multi-phase adaptive recoding operation in which the first transmission phase implements systematic recoding with respect to packets transmitted in the first transmission phase and the second transmission phase implements adaptive recoding with respect to packets transmitted in the second transmission phase.

7. The method of claim 1, wherein the plurality of packets of the first transmission phase and the number of packets of the second transmission phase are transmitted in a multi-phase recoding packet structure including data fields for encoder identification (ID) and file ID.

8. The method of claim 7, wherein the multi-phase recoding packet structure further includes data fields for packet ID and a number of recoded packets.

9. The method of claim 1, further comprising:
ending transmission of the batch of BNC packets by the first network node when a transmission phase of the multiple phase transmission of the batch of the BNC packets exceeds a maximum allowed number of transmission phases, or when the first network node has no further packets with linearly independent coefficient vectors are available for transmission.

10. A method for communicating batches of batched network coding (BNC) packets between network nodes of a multi-hop wireless network, the method comprising:
receiving, under control of multi-phase recoding logic of a second network node of a communication link hop in the multi-hop wireless network, one or more packets of a plurality of packets for a first transmission phase of multiple phase transmission of a batch of the BNC packets;
determining, by the multi-phase recoding logic, multi-phase recoding feedback with respect to the first transmission phase of the multiple phase transmission of the batch of the BNC packets;
transmitting, under control of the multi-phase recoding logic, the multi-phase recoding feedback to a first network node of the communication link hop; and
receiving, under control of the multi-phase recoding logic, one or more packets of a number of packets for a second transmission phase of the multiple phase transmission of the batch of the BNC packets.

11. The method of claim 10, wherein the number of packets for the second transmission phase is based on the multi-phase recoding feedback.

12. The method of claim 10, wherein the multi-phase recoding feedback comprises information regarding packets of the first transmission phase received at the second network node.

13. The method of claim 12, wherein the information regarding packets of the first transmission phase received at the second network node includes phase rank information with respect to the batch of the BNC packets at the second network node.

14. The method of claim 12, wherein the multi-phase recoding feedback is transmitted in a multi-phase recoding feedback packet structure including data fields for encoder identification (ID), file ID, batch ID, and phase rank information.

15. The method of claim 10, wherein the first transmission phase and the second transmission phase are transmitted in accordance with multi-phase adaptive recoding operation in which at least one of the first transmission phase or the second transmission phase implements adaptive recoding with respect to packets of that phase.

16. The method of claim 10, wherein the first transmission phase and the second transmission phase are transmitted in accordance with systematic multi-phase adaptive recoding operation in which the first transmission phase implements systematic recoding with respect to packets of the first transmission phase and the second transmission phase implements adaptive recoding with respect to packets of the second transmission phase.

17. The method of claim 10, wherein the plurality of packets of the first transmission phase and the number of packets of the second transmission phase are in a multi-phase recoding packet structure including data fields for encoder identification (ID) and file ID.

18. The method of claim 17, wherein the multi-phase recoding packet structure further includes data fields for packet ID and a number of recoded packets.

19. The method of claim 10, wherein packets of the batch of BNC packets transmitted by the first network node end when a transmission phase of the multiple phase transmission of the batch of BNC packets exceeds a maximum allowed number of transmission phases, or when the first network node has no further packets with linearly independent coefficient vectors are available for transmission.

20. The method of claim 10, further comprising:
organizing, by a batch management system implemented by the multi-phase recoding logic, the batches of the BNC packets and corresponding files communicated via the second network node;
tracking, by the batch management system, a timeout status of the batches of BNC packets and the corresponding files; and
discarding, under control of the batch management system, batches of the batches of the BNC packets and files of the corresponding files having reached an outdated status.

21. The method of claim 20, further comprising:
implementing, by the batch management system, one or more timeout heap configured for tracking the timeout status of the batches of BNC packets and the corresponding files; and
implementing a batch structure and a file structure configured for organizing the batches of the BNC packets and the corresponding files.

22. The method of claim 21, further comprising:
mapping, by the batch management system, encoder identification (ID) and file ID pairs to corresponding ones of the batch structure and the file structure.

23. A system for communicating batches of batched network coding (BNC) packets between network nodes of a multi-hop wireless network, the system comprising:
a first network node having multi-phase recoding logic configuring the first network node to:
transmit a plurality of packets as a first transmission phase of multiple phase transmission of a batch of the BNC packets;
receive multi-phase recoding feedback with respect to the first transmission phase of the multiple phase transmission of the batch of the BNC packets;
determine a number of packets of the batch of BNC packets to transmit as a second transmission phase of the multiple phase transmission of the batch of the BNC packets based on the multi-phase recoding feedback; and
transmit the number of packets as the second transmission phase of the multiple phase transmission of the batch of BNC packets; and
a second network node having multi-phase recoding logic configuring the second network node to:
receive one or more packets of the plurality of packets for the first transmission phase of multiple phase transmission of the batch of the BNC packets;
determine the multi-phase recoding feedback with respect to the first transmission phase of the multiple phase transmission of the batch of the BNC packets;
transmit the multi-phase recoding feedback to the first network node; and
receive one or more packets of the number of packets for the second transmission phase of the multiple phase transmission of the batch of the BNC packets.

24. The system of claim 23, wherein the multi-phase recoding feedback comprises information regarding packets of the first transmission phase received at the second network node.

25. The system of claim 24, wherein the information regarding packets of the first transmission phase received at the second network node includes phase rank information with respect to the batch of the BNC packets at the second network node.

26. The system of claim 24, wherein the multi-phase recoding feedback is transmitted in a multi-phase recoding feedback packet structure including data fields for encoder identification (ID), file ID, batch ID, and phase rank information.

27. The system of claim 23, wherein the first transmission phase and the second transmission phase are transmitted in accordance with multi-phase adaptive recoding operation in which at least one of the first transmission phase or the second transmission phase implements adaptive recoding with respect to packets of that phase.

28. The system of claim 23, wherein the first transmission phase and the second transmission phase are transmitted in accordance with systematic multi-phase adaptive recoding operation in which the first transmission phase implements systematic recoding with respect to packets of the first transmission phase and the second transmission phase implements adaptive recoding with respect to packets of the second transmission phase.

* * * * *

UNITED STATES PATENT AND TRADEMARK OFFICE
CERTIFICATE OF CORRECTION

PATENT NO. : 12,224,929 B2
APPLICATION NO. : 17/941921
DATED : February 11, 2025
INVENTOR(S) : Ho Fai Hoover Yin et al.

Page 1 of 1

It is certified that error appears in the above-identified patent and that said Letters Patent is hereby corrected as shown below:

In the Specification

At Column 13, Line number 48, Equation 3, delete the portion of the equation reading "$R(r_i)t_{i,r_i}$" and replace with --$P(r_i)t_{i,r_i}$--.
At Column 14, Line number 27, delete "a i packets" and replace with --$\alpha_i$ packets--.
At Column 23, Line number 30, delete "timestamp tin" and replace with --timestamp t in--.

Signed and Sealed this
Twenty-fifth Day of March, 2025

Coke Morgan Stewart
*Acting Director of the United States Patent and Trademark Office*